(12) United States Patent
Jost

(10) Patent No.: US 11,529,925 B2
(45) Date of Patent: Dec. 20, 2022

(54) VEHICLE SIDE AIRBAG

(71) Applicant: Zoox, Inc., Foster City, CA (US)

(72) Inventor: Markus Jost, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 17/357,500

(22) Filed: Jun. 24, 2021

(65) Prior Publication Data

US 2021/0316696 A1    Oct. 14, 2021

Related U.S. Application Data

(62) Division of application No. 16/140,259, filed on Sep. 24, 2018, now Pat. No. 11,091,113.

(51) Int. Cl.
| | |
|---|---|
| *B60R 21/231* | (2011.01) |
| *B60R 21/0136* | (2006.01) |
| *B60R 21/015* | (2006.01) |
| *B60R 21/2334* | (2011.01) |
| *B60R 21/01* | (2006.01) |

(52) U.S. Cl.
CPC ...... *B60R 21/23138* (2013.01); *B60R 21/015* (2013.01); *B60R 21/0136* (2013.01); *B60R 21/2334* (2013.01); *B60R 2021/01013* (2013.01); *B60R 2021/23146* (2013.01)

(58) Field of Classification Search
CPC .............................. B60R 21/16; B60R 21/013
See application file for complete search history.

(56) References Cited

U.S. PATENT DOCUMENTS

| | | | |
|---|---|---|---|
| 6,988,026 B2 | 1/2006 | Breed et al. | |
| 7,559,605 B2 | 7/2009 | Yoshikawa et al. | |
| 7,738,678 B2 | 6/2010 | Breed et al. | |
| 7,806,428 B2 | 10/2010 | Yoshikawa et al. | |
| 7,860,625 B2 | 12/2010 | Jaramillo et al. | |
| 8,235,416 B2 | 8/2012 | Breed et al. | |
| 8,538,636 B2 | 9/2013 | Breed | |

(Continued)

FOREIGN PATENT DOCUMENTS

| | | |
|---|---|---|
| DE | 102007013106 | 9/2008 |
| DE | 102009041540 | 4/2010 |

(Continued)

OTHER PUBLICATIONS

Chinese Office Action dated Mar. 15, 2022 for Chinese Patent Application No. 201980062369.6, a foreign counterpart to U.S. Pat. No. 11,091,113, 5 pages.

(Continued)

*Primary Examiner* — Nicole T Verley

(74) *Attorney, Agent, or Firm* — Lee & Hayes, P.C.

(57) ABSTRACT

An airbag for a vehicle, such as a side airbag, may be mounted to or proximate to a seat assembly on which a passenger may sit. The side airbag may include a chamber and an inflator configured to cause the chamber to expand toward the passenger to slow an acceleration of the passenger responsive to an imminent impact of the vehicle with another object or surface. Upon deployment of the chamber, the side airbag may cause a portion of the seat assembly (a seat tub, seat pan, and/or cushion coupled thereto) to deform toward the passenger seated thereon while remaining occluded from the passenger by the assembly. In some examples, the chamber may be stored in an unfolded position to allow for a more rapid deployment.

20 Claims, 11 Drawing Sheets

(56) References Cited

U.S. PATENT DOCUMENTS

| | | |
|---|---|---|
| 8,596,675 B2 | 12/2013 | Kwon et al. |
| 9,008,854 B2 | 4/2015 | Breed |
| 9,446,730 B1 | 9/2016 | Chen et al. |
| 9,539,969 B2 | 1/2017 | Crandall et al. |
| 9,931,964 B2 | 4/2018 | Le et al. |
| 9,975,516 B2 | 5/2018 | Kobayashi |
| 10,029,639 B2 | 7/2018 | Kim |
| 10,300,880 B2 | 5/2019 | Mihm |
| 10,632,958 B2 | 4/2020 | Dry et al. |
| 10,647,286 B1 | 5/2020 | Dennis et al. |
| 10,696,261 B2 | 6/2020 | Cheng et al. |
| 10,710,540 B2 | 7/2020 | Fukawatase et al. |
| 2005/0067209 A1 | 3/2005 | Yoshikawa et al. |
| 2006/0017266 A1 | 1/2006 | Yoshikawa et al. |
| 2007/0235990 A1 | 10/2007 | Yoshikawa et al. |
| 2014/0007761 A1 | 1/2014 | Haidar |
| 2014/0300088 A1 | 10/2014 | Fukawatase |
| 2015/0197248 A1 | 7/2015 | Breed et al. |
| 2016/0311349 A1 | 10/2016 | Honda et al. |
| 2017/0028960 A1 | 2/2017 | Kobayashi et al. |
| 2019/0322233 A1 | 10/2019 | Rivaya |
| 2020/0094771 A1 | 3/2020 | Jost |

FOREIGN PATENT DOCUMENTS

| | | |
|---|---|---|
| DE | 102010032449 | 2/2012 |
| EP | 2746112 | 6/2014 |

OTHER PUBLICATIONS

European Office Action dated Mar. 29, 2022 for European Patent Application No. 19783794.1, a foreign counterpart to U.S. Pat. No. 11,091,113, 5 pages.

Non Final Office Action dated Aug. 20, 2020 for U.S. Appl. No. 16/140,259, "Vehicle Side Airbag", Jost, 8 pages.

Office Action for U.S. Appl. No. 16/140,259, dated Feb. 1, 2021, Jost, "Vehicle Side Airbag", 4 pages.

PCT Search Report and Written Opinion dated Nov. 21, 2019 for PCT Application No. PCT/US2019/052518, 12 pages.

VEHICLE SIDE AIRBAG

CROSS-REFERENCE TO RELATED APPLICATIONS

This application is a divisional of, and claims priority to, U.S. patent application Ser. No. 16/140,259, filed Sep. 24, 2018, and entitled "VEHICLE SIDE AIRBAG," the entire contents of which are incorporated herein by reference.

BACKGROUND

Vehicles may be equipped with side airbags to protect passengers riding therein from side impact with an object, such as, for example, another vehicle. Upon deployment, traditional side airbags expand into the passenger compartment, directly impinging on the occupant in the event of a collision. However, tearing of the seat or trim upon deployment can increase a chance of injury for the passenger due to excess materials, such as pieces of trim, being thrown into the passenger compartment. Additionally, the expansion of the airbags themselves into the passenger compartment has the potential to injure the passenger.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 1A illustrates the example side airbag in a stowed position.

FIGS. 2A, 2B, and 2C are perspective views of example side airbags mounted in a seat tub of a vehicle in a stowed position. FIG. 2A is an illustration of the example side airbag with respect to a passenger located in a seat. FIG. 2B is an illustration of an example side airbag configured to deploy from a bottom end of the side airbag. FIG. 2C is an illustration of an alternate example side airbag configured to deploy from a back end of the side airbag.

DETAILED DESCRIPTION

Figure 1A:
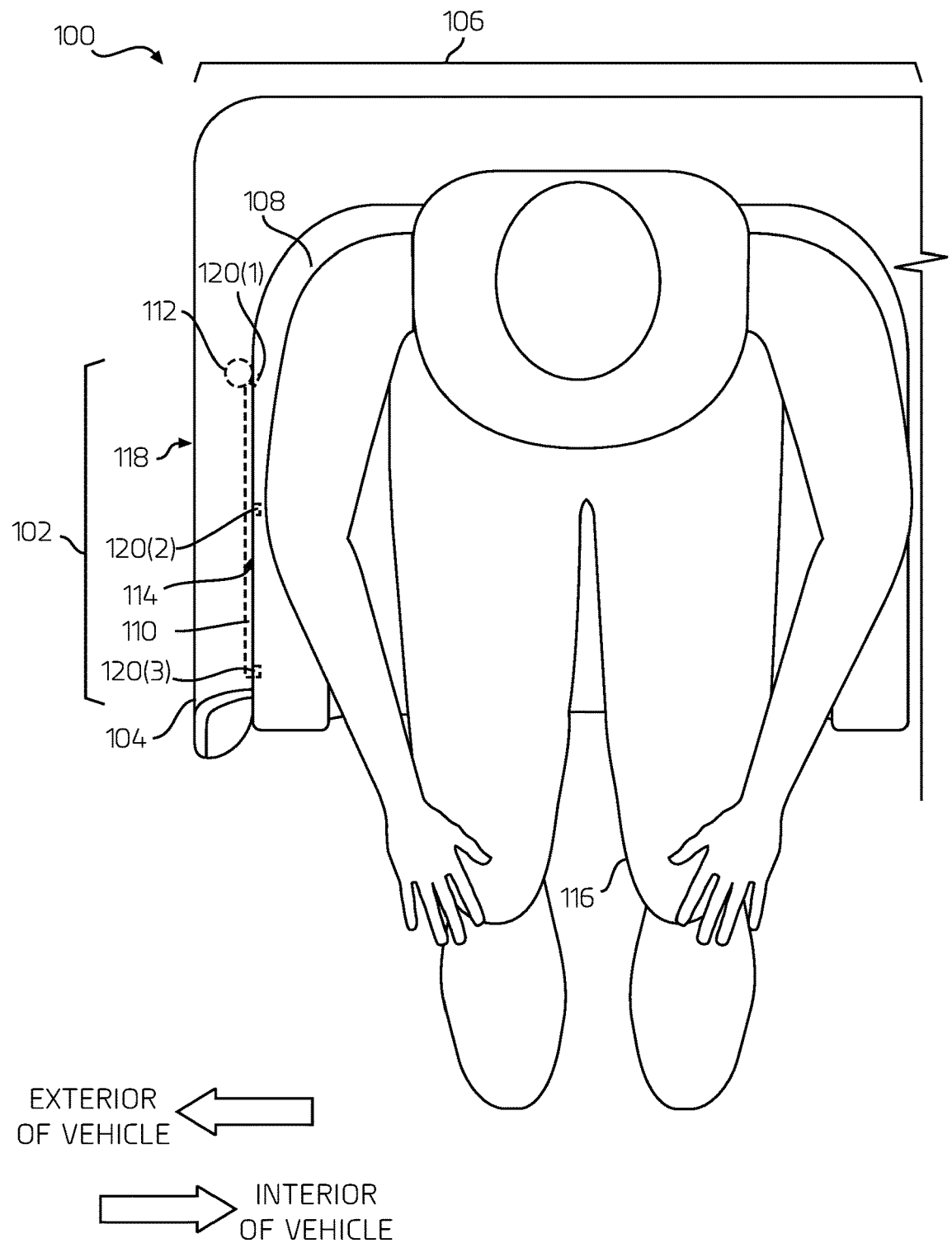
FIGS. 1A and 1B are top views of an example side airbag mounted in a seat tub of a vehicle.

This disclosure is directed to a side airbag configured to protect a passenger in a vehicle from a side impact with an object, such as, for example, another vehicle, a pole, a wall, or the like. The vehicle may include an autonomous, semi-autonomous, or manually operated vehicle. The vehicle may include a body having a passenger compartment with one or more seat assemblies to accommodate passengers. The seat assemblies may include a seat tub, a seat pan, and a seat cushion upon which a passenger may sit. The seat tub may include a receiver for at least a portion of seat cushion for coupling the seat cushion to a frame of the vehicle. The side airbag may be configured to deploy from inside the seat assembly, expanding the material of the seat tub and/or the seat cushion. Thus, the side airbag may slow the sideward velocity of the passenger without coming into direct contact with the passenger, thereby reducing injuries, such as may be due to the passenger being out of position (e.g., out of a designed and/or ideal seated position). Also, by deforming the material of the seat tub and/or the seat cushion without tearing through or breaching the material of the seat tub and/or the seat cushion, passenger injury due to flying debris can be avoided.

In some examples, the airbag may be mounted on an interior surface of the seat tub or the seat pan on a side of the seat tub proximate a lateral side of the passenger compartment (e.g., between a passenger and the lateral side of the passenger compartment). In other examples, the airbag may be mounted to an exterior surface of the seat tub or the seat pan. In yet other examples, the airbag may be mounted to a surface of the vehicle that is separate from the seat assembly, such as, for example, a seat frame to which the seat tub or seat pan may be mounted.

In some examples, the airbag may be coupled to or proximate to (e.g., on a seat frame to which the seat tub or seat pan is coupled, a body of the vehicle, or other structural component of the vehicle) the seat tub or seat pan. In some examples, the airbag may be stowed in an unfolded condition. In such an example, since the airbag is unfolded, the airbag may be configured for fast deployment upon impact, thereby reducing a potential for passenger injuries associated with the passenger being out of position. In some examples, the airbag may be stowed in a folded condition. The folded condition may include a roll fold, a tuck fold, a z-fold, or other folded pattern. In some examples, the airbag may be packed in a storage container inside or outside a bottom or side of the seat tub. In such examples, the airbag may be configured to expand out of the storage container and toward the passenger.

In some examples, the airbag may include a chamber with a single compartment configured to hold gas. In other examples, the chamber may include multiple compartments configured to hold gas. In such examples, the multiple compartments may include different sizes, shapes, materials, gas pressures, or the like. The airbag may additionally include an inflator configured to fill the chamber of the airbag with gas upon impact and/or imminent impact with an external object, such as, for example, another vehicle, a pole, a wall, or the like. The inflator may include a cold gas inflator, a pyrotechnic inflator, a hybrid inflator, or any other inflator configured to fill the chambers with gas.

In various examples, the inflator may receive a signal from an impact sensor on the vehicle. The impact sensor may detect a collision and send an electrical signal to the inflator to cause the inflator to deploy the airbag (e.g., fill the chamber(s) with gas). Additionally, or in the alternative, the vehicle may include perception sensors configured to perceive objects in an environment of the vehicle and send sensor data to a vehicle computing device. The perception sensors may include, for example, image capture devices (RGB cameras, intensity cameras, infra-red cameras, stereo cameras, depth cameras, etc.), light detection and ranging (LIDAR) sensors, and radio detection and ranging (RADAR) sensors, or the like. In some examples, the vehicle computing device may receive sensor data from the perception sensors and may determine that a side impact is imminent. In some examples, a determination that a side impact is imminent may be based on a time associated with a side impact being within a threshold time (e.g., 3 seconds, 5 seconds, etc.). The threshold time may be a pre-determined amount of time and/or may be based on a speed of the vehicle and/or the object, an acceleration of the vehicle and/or the object, weather, traffic density, and/or other considerations. Based on a determination that the side impact is imminent, the vehicle computing device may send a signal to the inflator to cause the inflator to fill the chamber with gas prior or concurrently with the side impact.

Upon deployment, the airbag may expand as the chamber is filled with gas. In various examples, the airbag may be configured to deform the seat tub and seat cushion during expansion. In such examples, the deployed airbag may push against a surface proximal to the passenger, deforming the seat tub, the seat pan, and/or the seat cushion toward the passenger. In some examples, the airbag may be configured to expand through an opening in the seat pan. In such examples, the deployed airbag may push against the seat cushion toward the passenger.

In some examples, the airbag may be coupled to an interior surface of the seat tub or the seat pan proximal to the passenger. In such examples, the airbag may extend from the interior surface of the seat tub or the seat pan and substantially deform the cushion. In some examples, the airbag may be disposed between the interior surface of the seat tub or seat pan and a trim associated with the seat tub or seat pan. In such examples, the airbag may extend from the interior surface of the seat tub or seat pan and substantially deform the trim and the cushion.

The deformed seat tub, seat pan, trim, and/or seat cushion of the seat assembly may prevent at least part of the passenger's body (e.g., hips, thorax, etc.) from excessive acceleration upon impact with the external object. The deformed seat tub, seat pan, and/or seat cushion improves upon traditional airbags in that the risk of injury to the passenger is decreased due to the airbag not entering the passenger compartment. Additionally, a deformation of the seat tub, seat pan, and/or the seat cushion prevents additional injuries caused by objects (e.g., pieces of trim, metal pieces, etc.) being thrown into the passenger compartment due to the airbag deployment.

In various examples, some or all of the seat assembly may be configured to be removed and/or replaced without disturbing the airbag. For example, an airbag may be mounted to an external seat frame and an entire seat assembly may be removed and/or replaced without disturbing the airbag. For another example, an airbag may be mounted to an interior surface of the seat tub and the seat cushion may be removed and/or replaced without disturbing the airbag.

Figure 1B:
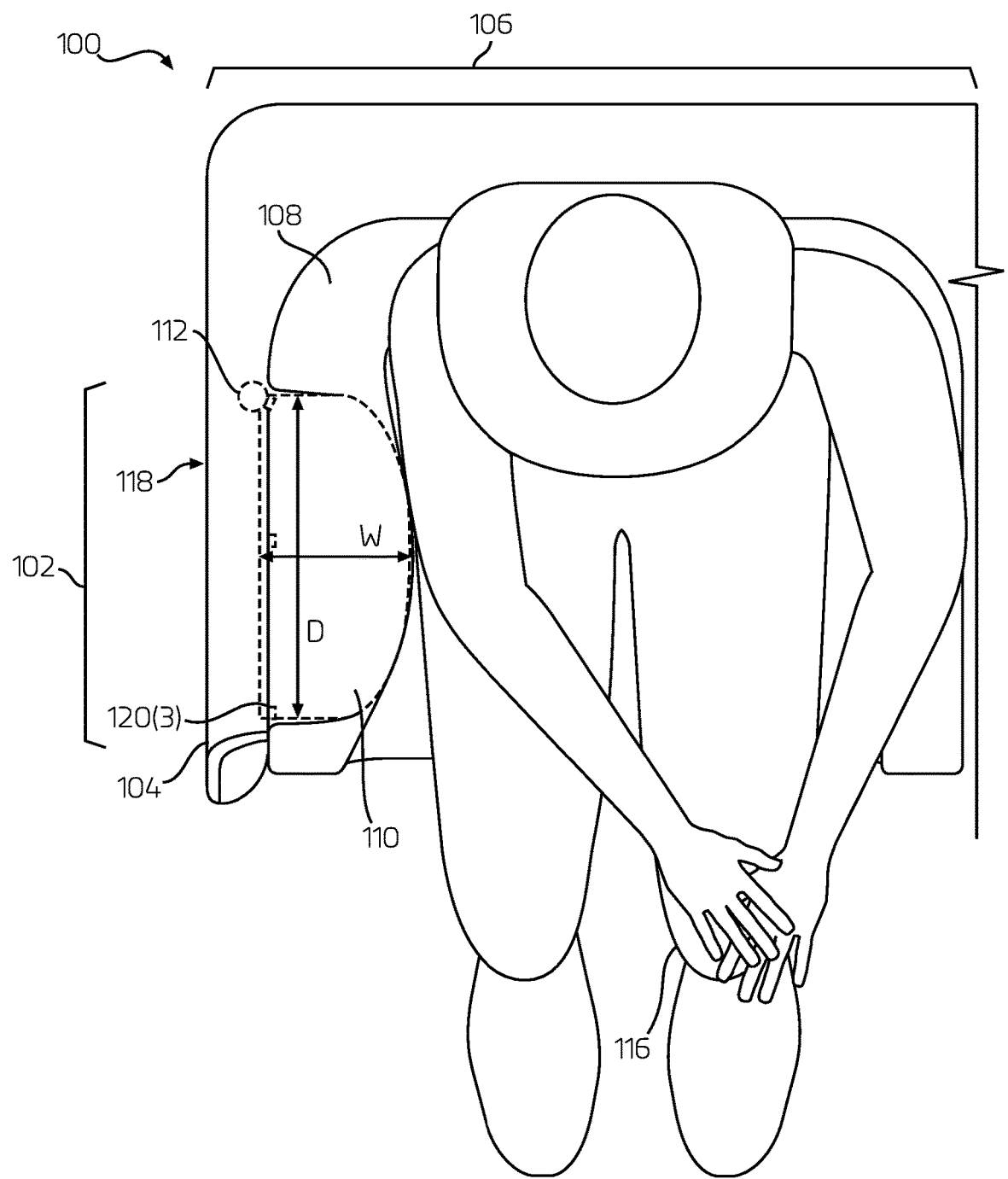

FIGS. 1A and 1B are top views 100 of an example side airbag 102 mounted in a seat tub 104 of a vehicle (not illustrated). The seat tub 104 may comprise a receiver for coupling to at least a portion of a seat cushion 108 and/or a seat pan (not illustrated). Such a seat tub 104 may, for example, be used to couple the seat cushion 108, via the seat pan, to a vehicle frame. FIG. 1A illustrates the example side airbag in a stowed (e.g., uninflated) position. In various examples, a seat assembly 106 of the vehicle may include the seat tub 104 and a seat cushion 108. In some examples, the vehicle may include one or more seat assemblies 106. In some examples, the vehicle may include a pair of opposing seat assemblies 106 that face each other within a passenger compartment of the vehicle.

The seat tub and/or the seat pan may include a plastic material (e.g., polypropylene, polyethylene, etc.), a metal material (e.g., aluminum, titanium, etc.), a composite material (e.g., carbon fiber, fiber glass, etc.), or a combination thereof. In at least one example, the seat tub 104 may include a polypropylene material. The seat cushion 108 may include a foam material (e.g., polystyrene, polyethylene, etc.), a polyurethane material, a rubber material (e.g., polyisoprene, EPDM ethylene propylene, neoprene, etc.), a fabric material (e.g., cotton, polypropylene, etc.), or a combination thereof. In at least one example, the seat cushion 108 may include a polyurethane material.

In various examples, the side airbag 102 may include a chamber 110 and an inflator 112. In some examples, the chamber 110 may include two or more compartments configured to hold gas. In such examples, the compartments may be the same or different sizes, shapes, materials, etc. In some examples, the compartments may be configured to hold the same or different gas pressures. In at least one example, the chamber 110 may include a single compartment configured to hold gas. The chamber 110 may include a fabric material, such as, for example, nylon, cotton, silk, polyester, wool, or the like. The inflator 112 may include a pyrotechnic inflator, a cold gas inflator, a compressed gas inflator, a hybrid inflator, or the like. The inflator 112 may be configured to receive a signal indicating a collision and/or an imminent collision with an object and based on the signal may fill the chamber 110 with gas.

In the illustrated example, the side airbag 102 is coupled on an interior surface 114 of a side portion of the seat tub 104. The interior surface 114 of the seat tub 104 may include a surface located proximal to a passenger 116 (e.g., farthest from a frame of the vehicle. In some examples, the side airbag 102 may be coupled to an exterior surface 118 of the seat tub 104. As will be discussed in greater detail below with respect to FIGS. 5 and 6, the side airbag 102 may be coupled to a vehicle frame, such as, for example, an external seat frame to which the seat assembly 106 may be coupled. In various examples, the seat tub 104 may include a portion of the external seat frame.

In various examples, the side airbag 102 may be coupled to the seat tub 104 and/or external seat frame via one or more couplings 120. The coupling(s) 120 may include snap-fit couplings, screws, rivets, spring-type couplings, or any other mechanical coupling configured to securely couple the side airbag 102 to a surface. In the illustrative example, the side airbag 102 is coupled to the seat tub 104 with three couplings 120(1), 120(2), and 120(3). In other examples, the side airbag 102 may be coupled to the seat tub 104 and/or external seat frame with a greater or lesser number of couplings 120.

In various examples, the side airbag 102 may be mounted (e.g., coupled to the seat tub 104 and/or the external seat frame) in a folded position. In such examples, the side airbag 102 may be folded in a roll fold, a tuck fold, a z-fold, origami-inspired fold, and/or any other style of fold of an airbag. As will be discussed in more detail below with regard to FIG. 6, the side airbag 102 may be stored in a folded position and mounted in a storage container. In such examples, the storage container may be coupled to the seat tub 104 and/or the vehicle frame. In at least one example, the side airbag 102 may be mounted in an unfolded position. In such an example, the side airbag 102 may be configured to deploy at a faster rate than an airbag mounted in the folded position.

The inflator 112 of the side airbag 102 may be configured to receive a signal indicating a collision and/or an imminent collision with an object. In some examples, the inflator 112 may receive the signal from one or more impact sensors (not shown). The impact sensor(s) may detect a collision and send an electrical signal to the inflator 112 to cause the inflator 112 to deploy the side airbag 102 (e.g., fill the chamber(s) 110 with gas).

As will be discussed in further detail below with regard to FIG. 7, the vehicle may include perception sensors configured to perceive an environment and send sensor data to a vehicle computing device. The perception sensors may include image capture devices, LIDAR sensors, and RADAR sensors, or the like. In some examples, the vehicle computing device may receive sensor data from the perception sensors and may determine that a side impact is imminent. A determination that a side impact is imminent may include detecting an object (e.g., another vehicle, pole, wall, etc.) in the environment and determining that the object has a high closure rate toward a side of the vehicle (e.g., the vehicle sliding toward the object, an object trajectory aimed at side of the vehicle, etc.), and/or determining that a predicted trajectory of the object intersects with a trajectory or planned path of the vehicle. Based on the determination that the side impact is imminent, the vehicle computing device may send a signal to the inflator 112 to cause the inflator 112 to fill the chamber 110 with gas prior or concurrently with the side impact.

In various examples, the vehicle computing device may be configured to determine a predicted time of impact. The predicted time of impact may be based on a speed of the vehicle, an acceleration of the vehicle, a speed of the object, an acceleration of the object, a closure rate of the object toward the vehicle, road conditions, weather conditions, and/or other factors that may affect a closure rate of an object toward a vehicle or vice versa. In some examples, the vehicle computing device may send a signal to the inflator to deploy concurrently with or immediately prior to (e.g., 0.1 milliseconds, 0.2 milliseconds, 0.5 milliseconds, etc.) the time of impact.

In some examples, a determination that the side impact is imminent may be based at least in part on the predicted time of impact. In some examples, the vehicle computing device may determine that the side impact is imminent based on the predicted time of impact being within a threshold period of time (e.g., 2 seconds, 4 seconds, 6 seconds, etc.). In various examples, the threshold period of time may be a predetermined time period. In such examples, the threshold period of time may include a constant value. In some examples, the threshold period of time may be determined based on a speed of the vehicle and/or object, an acceleration of the vehicle and/or object, weather, traffic density, and/or other factors affecting closure rates and/or vehicle control.

In various examples, the seat assembly 106 may include a position sensor (not illustrated in FIG. 1A), configured to determine whether a passenger is seated in the seat assembly 106. In some examples, the position sensor may include a weight switch configured to determine whether a weight is located in or on the seat assembly 106. The weight may include a minimum weight associated with a passenger 116 (e.g., 50 pounds, 25 kilograms, 100 pounds, etc.). In various examples, the position sensor may include an image capture device and/or other perception sensor disposed above the seat assembly 106 or elsewhere within the passenger compartment of the vehicle. In such examples, the image capture device and/or other perception sensor may send sensor data to the vehicle computing device to analyze and determine whether the object in the seat assembly is a passenger 116. In the case of a passenger, the perception sensor may also determine a size and/or shape of the passenger 116.

In various examples, the position sensor and/or the vehicle computing device may send an arming signal to the inflator 112 based on a determination that the seat assembly 106 is occupied with a passenger 116. Responsive to receiving the arming signal, the inflator 112 may arm (e.g., turn on, activate to be ready for a deployment signal, etc.). In some examples, the position sensor and/or the vehicle computing device may send a deployment instruction to the inflator 112. The deployment instruction may include an instruction on how to deploy the side airbag 102 (e.g., a speed of inflation, a pressure related to inflation, etc.). For example, the position sensor and/or the vehicle computing device may determine that the passenger 116 is a child and may send a deployment instruction to the inflator to cause the inflator, upon deployment, to reduce a pressure of the side airbag 102 to soften the impact for the child.

FIG. 1B illustrates the example side airbag in an extended (e.g., deployed) position. As discussed above, the inflator 112 may be configured to deploy (e.g., inflator 112 fills chamber 110 with gas) the side airbag 102 based on a signal from a sensor and/or a vehicle computing system. Responsive to receiving the signal to deploy and in some examples, an arming signal and/or deployment instruction, the inflator 112 may fill the chamber 110 with gas, causing the chamber 110 to expand toward the passenger 116. The inflator 112 may be configured to deploy the airbag a width W horizontally toward the passenger 116. In at least one example, the width W may be 190 millimeters. In other examples, the width W may be another distance greater or lesser than 190 millimeters (e.g., 150 millimeters, 175 millimeters, 200 millimeters, 250 millimeters, etc.). Additionally, the inflator 112 may be configured to deploy the airbag a depth D parallel to the passenger 116. In at least one example, the depth D may be 350 millimeters. In other examples, the depth D may be another distance greater or lesser than 350 millimeters (e.g., 300 millimeters, 325 millimeters, 375 millimeters, 400 millimeters, etc.).

In various examples, a deployment of the side airbag 102 may cause one or more components of the seat assembly to extend from the uninflated position, such as that shown in FIG. 1A. In some examples, at least part of a side portion of the seat tub 104 (e.g., part of the side portion proximate to the passenger) may be configured to deform due to pressures imparted upon it by the deployed side airbag 102. In various examples, the portion of the seat tub 104 may include a trim of the seat tub 104. In such examples, the side airbag 102 may be situated between the trim and a surface of the seat tub 104. As will be discussed below with respect to FIG. 5, the side airbag 102 may be configured to deploy through an opening in the seat tub 104. In such examples, the seat tub 104 may not deform or may experience negligible deformity, such as, for example, a slight deformity around the edges of the opening in the seat tub. In some examples, the side airbag 102 may be coupled to an interior surface 114 of the seat tub 104 proximal to the passenger. In such examples, the seat tub 104 may experience no deformity or substantially no deformity upon airbag 102 deployment.

Additionally, or in the alternative, the seat cushion 108 of the seat assembly 106 may deform due to pressures imparted upon it by the deployed side airbag 102. As discussed above, in various examples, the seat cushion 108 may include a soft, pliable material configured to deform under pressure. In some examples, the deformed seat cushion 108 may be the surface the passenger 116 contacts upon side airbag 102 deployment. In such examples, the seat cushion 108 may prevent at least part of the passenger's 116 body (e.g., hips, thorax, etc.) from excessive acceleration resultant from a side impact with an object.

In various examples, some or all of the seat assembly 106 may configured to be removed and/or replaced without disturbing (e.g., decoupling, removing, disarming, etc.) the side airbag 102. In examples in which the side airbag 102 is coupled to an interior or exterior surface of the seat tub 104, the cushion 108 and/or the seat pan may be configured to be removed and/or replaced without disturbing the side airbag 102. In examples, in which the side airbag 102 is coupled to an external seat frame or other surface separate and distinct from the seat tub 104, the entire seat assembly 106, including at least the seat tub 104 and the seat cushion 108, may be configured to be removed and/or replaced without disturbing the side airbag 102. A removal of at least a portion of the seat assembly 106 without disturbing the side airbag 102 may decrease complexity and/or time associated with performing maintenance, cleaning, and/or removal of parts of the vehicle.

Figure 2A:
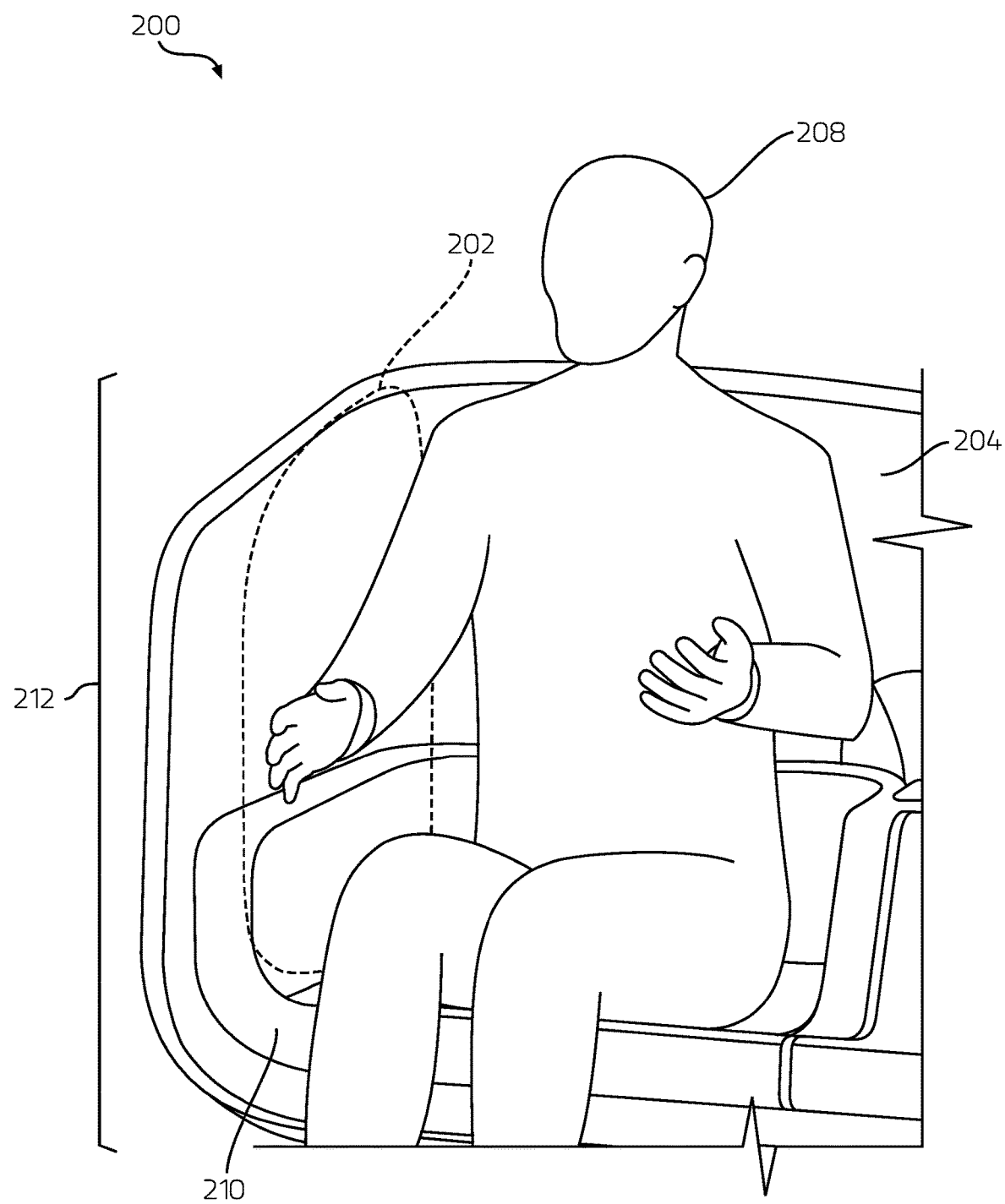
FIG. 2A illustrates the example side airbag in a deployed position.
Figure 2B:
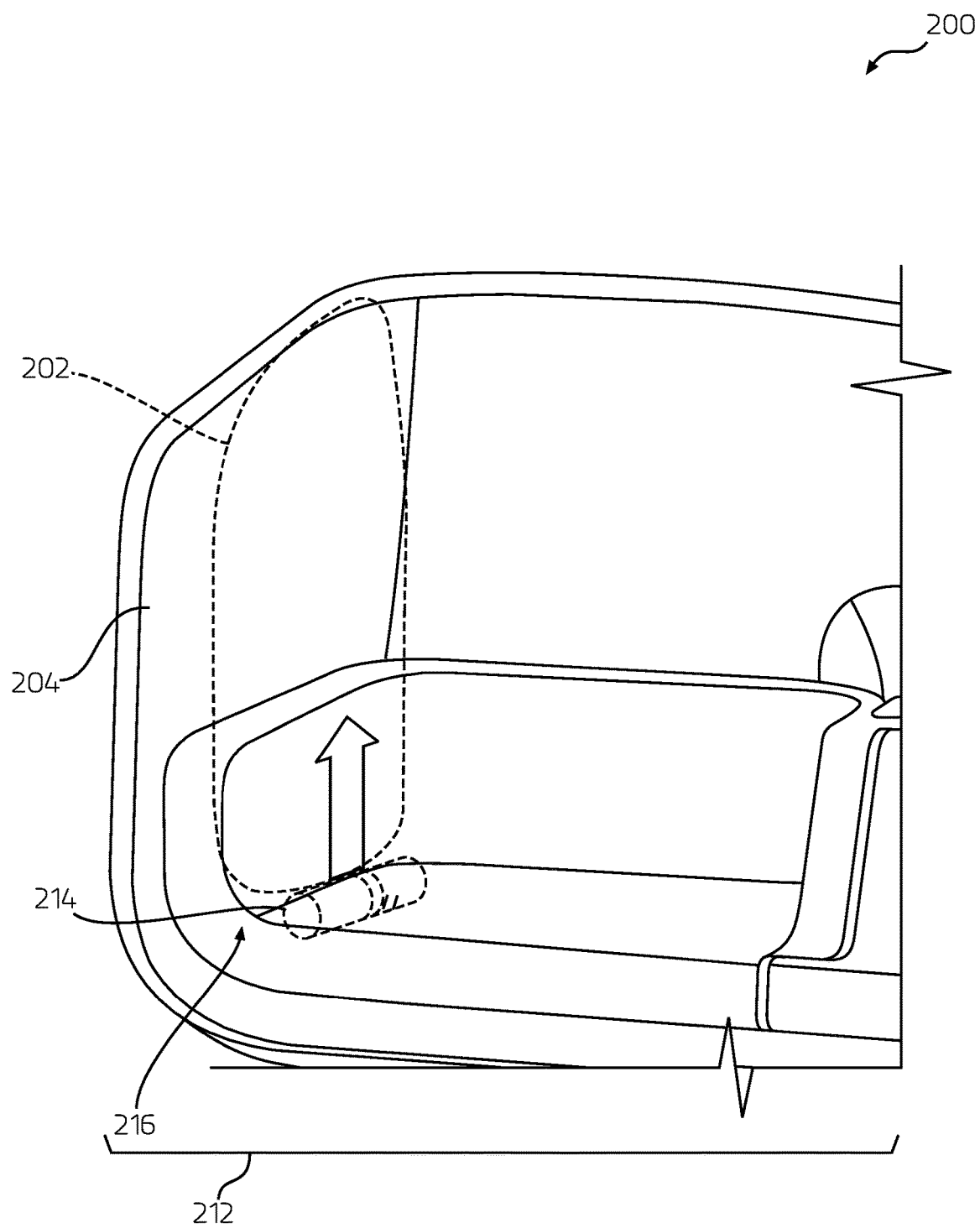
Figure 2C:
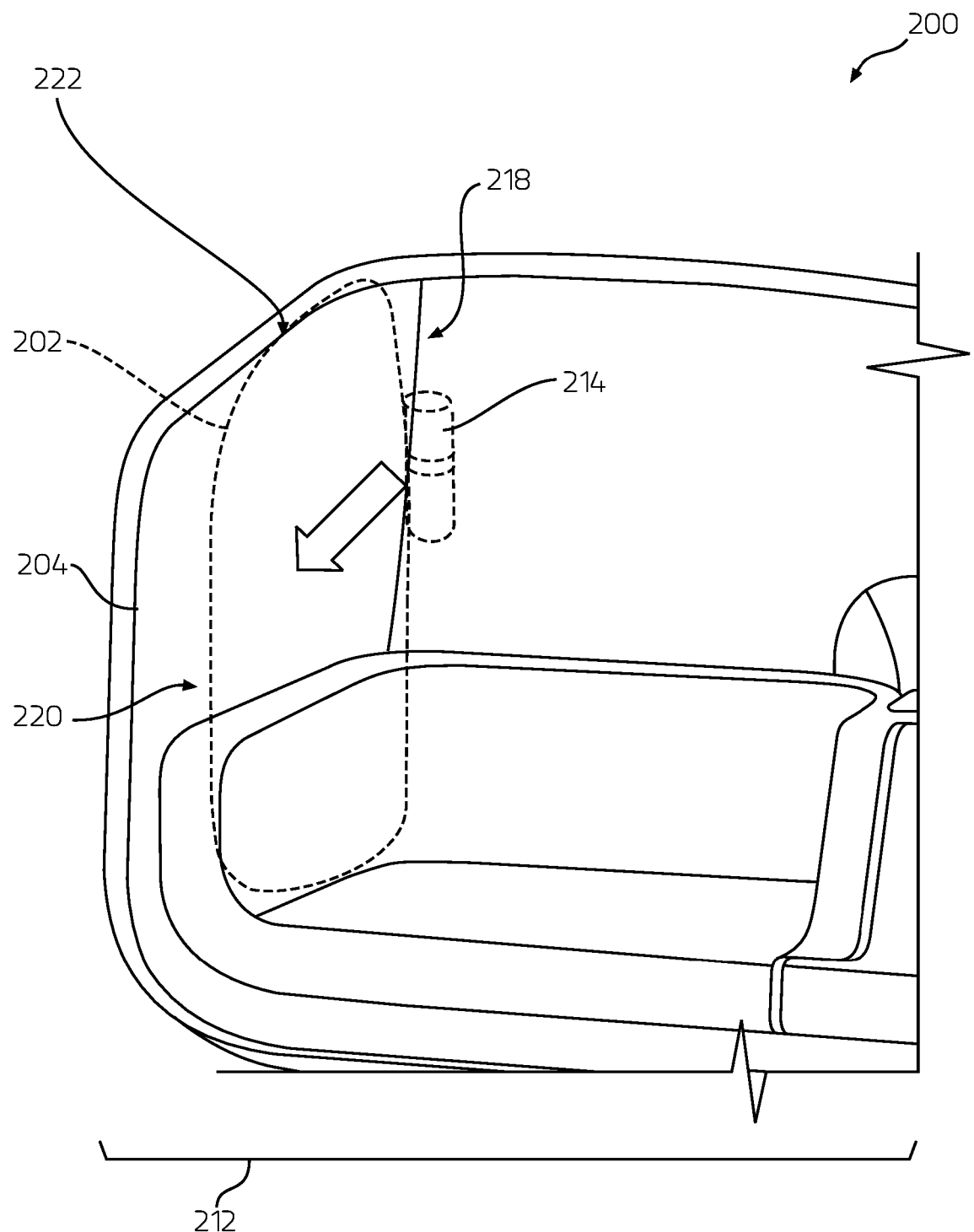

FIGS. 2A, 2B, and 2C are perspective views of an example environment 200 in which an example side airbag 202, such as side airbag 102 may be stowed in a seat tub 204, such as seat tub 104, of a vehicle. FIG. 2A is an illustration of the example side airbag 102 with respect to a passenger 208, such as passenger 116, located on a seat cushion 210 of a seat assembly 212, such as seat assembly 106. In the illustrative example, the airbag 202 is mounted in a right-side portion of the seat tub 204 (e.g., right side of passenger 208). In other examples, the airbag 202 may be mounted in a left-side portion of the seat tub 204 (e.g., left side of passenger 208).

In various examples, the seat tub 204 and the seat cushion 210 may have a same or substantially similar height. In such examples, the airbag 202 may be configured to extend to at least a portion of the height of the seat tub 204 and/or the cushion 210. In some examples, the seat tub 204 may extend higher than the seat cushion 210. In the illustrative example, the airbag 202 may extend to the height of the seat tub 204 (e.g., to a height greater than the seat cushion). In some examples, the airbag 202 may extend to a lesser height than illustrated in FIG. 2A (e.g., a height substantially equivalent to the height of the seat cushion 210, to a height taller than the seat cushion 210, but less than the height of the seat tub 204, a height configured to protect at least a portion of a thorax of the passenger 208, etc.).

In various examples, the airbag 202 may be coupled to a surface of the seat tub 204 (e.g., interior surface of the seat tub 204, exterior surface of the seat tub 204, etc.). In some examples, the airbag 202 may be coupled to surface separate from the seat tub 204, such as, for example, an external seat frame (not illustrated), a frame of the vehicle, or other surface separate from the seat assembly 212.

Responsive to receiving a signal indicating a side impact with an object, an inflator of the airbag 202 may cause a chamber of the airbag 102 to fill with gas. The chamber of the airbag 202 may be configured to expand toward the passenger (e.g., toward a center of the seat assembly 212), deforming at least a portion of the seat tub 204 and/or the seat cushion 210. In various examples, the chamber may expand toward the passenger through an opening in the seat tub 104. In some examples, the chamber may expand and may force at least a portion of the seat tub 104 (e.g., a wall of the seat tub 104, trim associated with the seat tub 104, an arm portion (e.g., right-side or left-side portion) of the seat tub, etc.) to deform toward the passenger. Additionally, or in the alternative, the chamber may expand and may force at least a portion of the seat cushion 210 to deform toward the passenger.

In various examples, the deformed portions of the seat tub 204 and/or the seat cushion 210 may expand toward the passenger, thereby preventing at least part of the passenger's 208 body (e.g., hips, thorax, etc.) from excessive acceleration upon side impact with the object. The deformed seat tub 204 and/or seat cushion 210 improves upon traditional airbags in that the risk of injury to the passenger is decreased due to the airbag not entering the passenger compartment. Additionally, a deformation of the seat tub 204 and/or the seat cushion 210 prevents additional injuries caused by projectiles (e.g., pieces of trim, metal pieces, etc.) being thrown into the passenger compartment due to the airbag 202 deployment.

FIG. 2B is an illustration of the example side airbag 202 configured to deploy from a bottom corner 216 of the seat assembly 212. As discussed above, the airbag 202 may include an inflator 214 configured to fill a chamber of the airbag 202 with gas. In the illustrative example, the inflator 214 may be mounted proximate to the bottom corner 216. The bottom corner may include a portion of the seat assembly 212 in which a side vertical portion and a horizontal portion of the seat intersect. In such an example, the inflator 214 may fill the chamber with gas from a bottom end of the chamber (e.g., airbag 202) vertically upward toward a top end of the chamber.

In various examples, the airbag 202 may be coupled to the seat tub 204, the external seat frame (not illustrated), and/or other surface external to the seat assembly 212 in a folded position. The fold may include a roll fold, a tuck fold, a z-fold, origami-inspired fold, and/or any other style of fold of an airbag. In some examples, the inflator 214 may cause the airbag 202 to unfold substantially vertically, as depicted in FIG. 2B, and expand toward the passenger, as discussed above, though any other deployment direction is contemplated so as to achieve a desired deformation of the seating components. In various examples, the airbag 202 may be coupled to the seat tub 204, the external seat frame (not illustrated), and/or other surface external to the seat assembly 212 in an unfolded position. In such examples, the inflator 214 may cause the chamber of the airbag 202 to fill with gas and expand substantially vertically and toward the passenger, as discussed above.

FIG. 2C is an illustration of the example side airbag configured to deploy from a back corner 218 of the seat assembly 212. In the illustrative example, the inflator 214 of the airbag may be mounted proximate to the back corner 218 of the seat assembly 212. The back corner may include a portion of the seat assembly 212 where a side vertical portion and a back vertical portion of the seat intersect. In such an example, the inflator 214 may fill the chamber with gas from a back end of the chamber (e.g., airbag 202) horizontally forward toward a front end of the chamber.

In various examples, the airbag 202 may be coupled to the seat tub 204, the external seat frame (not illustrated), and/or other surface external to the seat assembly 212 in a folded position. The fold may include a roll fold, a tuck fold, a z-fold, origami-inspired fold, and/or any other style of fold of an airbag. In some examples, the inflator 214 may cause the airbag 202 to unfold substantially horizontally, as depicted in FIG. 2B, and expand toward the passenger, as discussed above. In various examples, the airbag 202 may be coupled to the seat tub 204, the external seat frame (not illustrated), and/or other surface external to the seat assembly 212 in an unfolded position. In such examples, the inflator 214 may cause the chamber of the airbag 202 to fill with gas and expand substantially horizontally and toward the passenger, as discussed above.

Although illustrated in a position just above a centerline of the airbag 202, the inflator 214 may be coupled to the chamber of the airbag 202 on a centerline, below a centerline, above or below the centerline at a greater or lesser distance therefrom than illustrated, proximate to a bottom corner, or proximate to a top corner of the airbag 202. For example, the inflator 214 may be coupled to the chamber of the airbag 202 at a bottom end of the chamber at a confluence of the bottom corner and the back corner. Responsive to a signal to deploy, the inflator 214 may fill the chamber with gas to cause the chamber to expand substantially horizontally, substantially vertically, and toward the passenger.

In other examples, the inflator 214 may be coupled to a front end 220 of the airbag 202 at a position along the front end 220. In such examples, responsive to a signal to deploy, the inflator 214 may fill the chamber with gas substantially horizontally backward, toward the back corner of the seat assembly 212. In still yet other examples, the inflator 214 may be coupled to a top end 222 of the airbag 202 at a position along the top end 222. In such examples, responsive to a signal to deploy, the inflator 214 may fill the chamber with gas substantially vertically downward.

Figure 3:
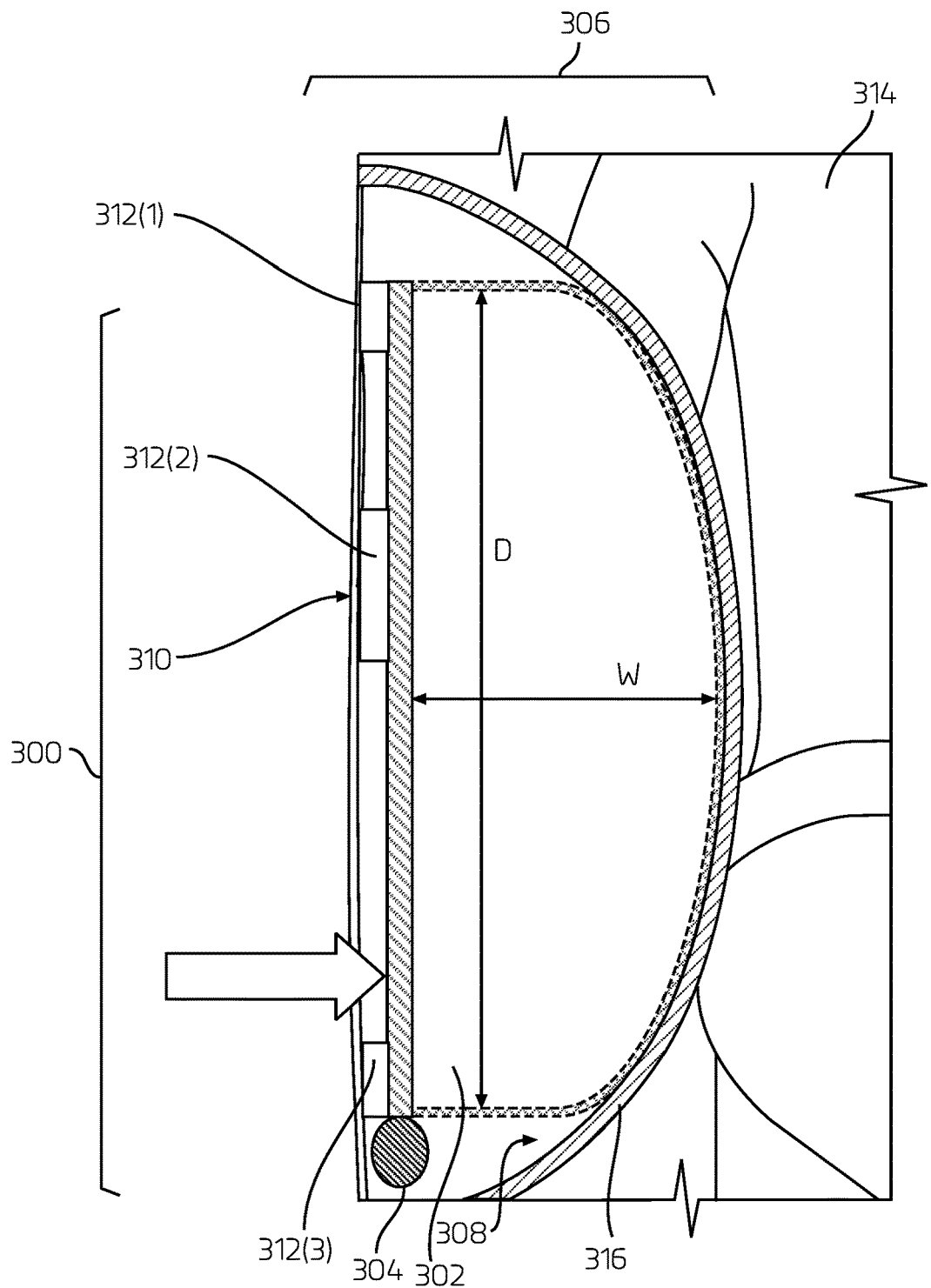
FIG. 3 is a front side cross-sectional view of an example airbag in an extended position.

FIG. 3 is a front side cross-sectional view of an example airbag 300, such as airbag 102, in the deployed position. The airbag 300 may include a chamber 302, such as chamber 110, and an inflator 304, such as inflator 112. In the illustrative example, the chamber 302 includes a single compartment. In other examples, the chamber 302 may include two or more compartments. In such examples, the two or more compartments may include the same or different materials, gas pressures, shapes, sizes, or the like. The inflator 304 may include a cold gas inflator, a pyrotechnic inflator, a hybrid inflator, or any other inflator configured to fill the chamber(s) 302 with gas.

As discussed above, the airbag 300 may be coupled to an exterior surface of the seat tub 306, such as seat tub 104. In some examples, the airbag 300 may be coupled to an interior surface 310 of the seat tub 306, such as interior surface 114. In some examples, the airbag 300 may be coupled to a surface separate from the seat tub 306, such as, for example, an external seat frame, a vehicle frame, or other component of a vehicle.

In various examples, the airbag 300 may be coupled to the seat tub 306 and/or a surface separate from the seat tub 306 via one or more couplings 312, such as couplings 120. The coupling(s) 312 may include snap-fit couplings, screws, rivets, spring-type couplings, or any other mechanical coupling configured to securely couple the airbag 300 to a surface. In the illustrative example, the airbag 300 is coupled to the seat tub 306 with three couplings 312(1), 312(2), and 312(3). In other examples, the airbag 300 may be coupled to the seat tub 306 and/or a surface separate from the seat tub 306 via a greater or lesser number of couplings 312.

Responsive to receiving a signal to deploy the airbag 300, such as from a sensor and/or a vehicle computing device, the inflator may fill the chamber 302 with gas, causing the chamber to expand vertically and horizontally toward a passenger 314, such as passenger 116. As discussed above, the airbag 300 may expand a width W horizontally toward the passenger 314. In at least one example, the width W may be 190 millimeters. In other examples, the width W may be another distance greater or lesser than 190 millimeters (e.g., 150 millimeters, 175 millimeters, 200 millimeters, 250 millimeters, etc.). Additionally, the inflator 112 may be configured to expand the airbag a height H vertically with respect to the passenger 314. In at least one example, the height H may be 450 millimeters. In other examples, the height H may be another distance greater or lesser than 450 millimeters (e.g., 400 millimeters, 425 millimeters, 475 millimeters, 500 millimeters, etc.).

In some examples, a trim of the seat tub 306 may be coupled to a trim surface 308. In such examples, the trim of the seat tub 306 may deform and expand toward the passenger 314. As additionally illustrated in FIG. 3, responsive to the deployment, a seat cushion 316, such as seat cushion 108, may deform and expand toward the passenger 314. In various examples, the seat cushion 316 may include a soft, pliable material. For example, the seat cushion may include a foam material (e.g., polystyrene, polyethylene, etc.), a polyurethane material, a rubber material (e.g., polyisoprene, EPDM ethylene propylene, neoprene, etc.), a fabric material (e.g., cotton, polypropylene, etc.), or a combination thereof. In some examples, the seat cushion 316 may provide a relatively soft surface to slow the acceleration of the passenger 314 during a side impact with an object.

Figure 4:
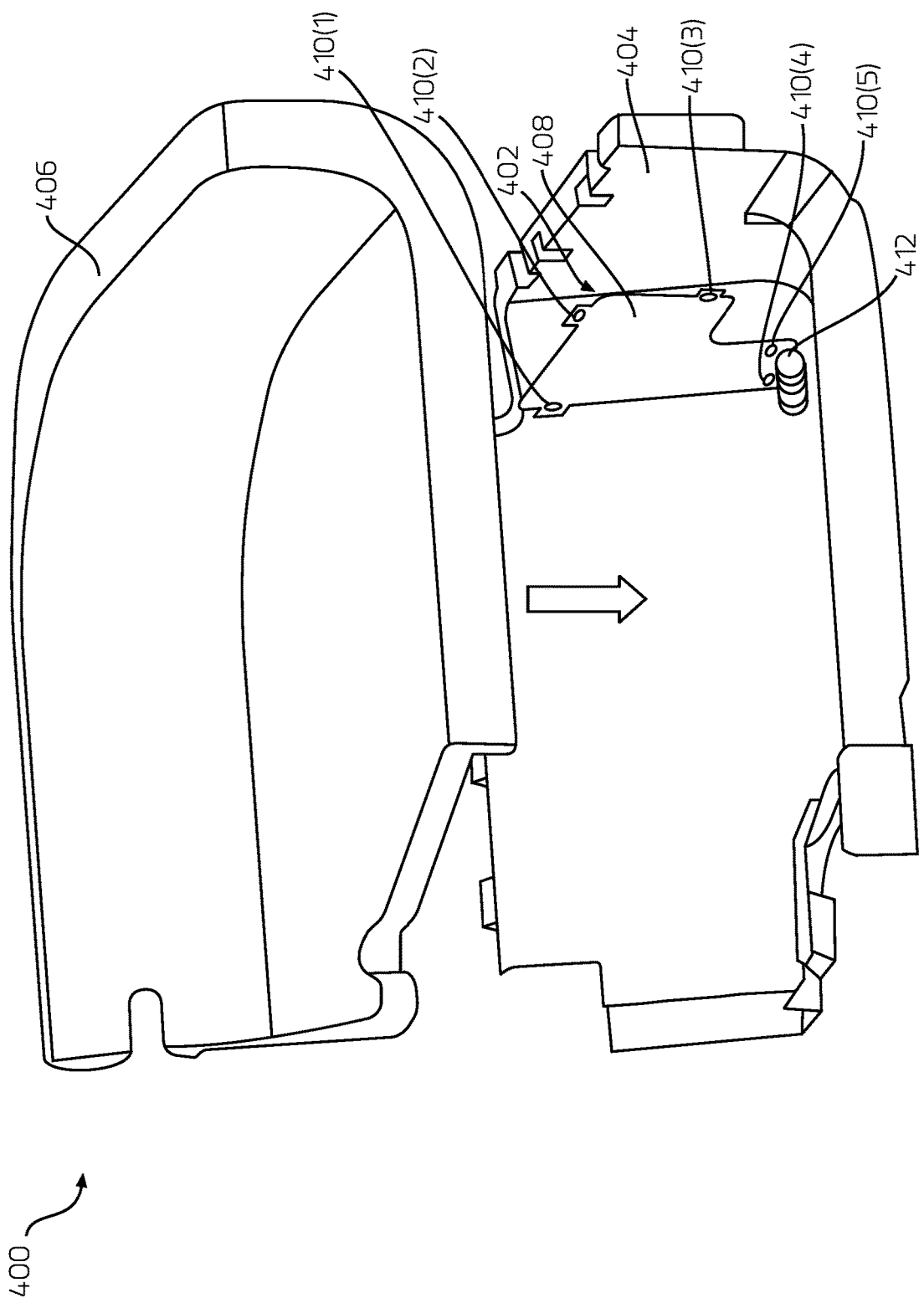
FIG. 4 is a front perspective exploded view of an example airbag mounted to a seat pan of a seat assembly.

FIG. 4 is a front perspective exploded view of a portion of an example seat assembly 400, such as seat assembly 106, including an example airbag 402, such as airbag 102. The seat assembly 400 may include a seat pan 404 and a seat cushion 406, such as seat cushion 108. In various examples, the seat pan 404 may be configured to couple to a seat tub, such as seat tub 104 and/or an external seat frame of a vehicle. Such a seat pan 404 may provide, for example, a hard surface with which to couple the seat cushion 108 to a vehicle frame.

The seat pan 404 may include a plastic material (e.g., polypropylene, polyethylene, etc.), a metal material (e.g., aluminum, titanium, etc.), a composite material (e.g., carbon fiber, fiber glass, etc.), or a combination thereof. In at least one example, the seat pan 404 may include a polypropylene material. The seat cushion 406 may include a foam material (e.g., polystyrene, polyethylene, etc.), a polyurethane material, a rubber material (e.g., polyisoprene, EPDM ethylene propylene, neoprene, etc.), a fabric material (e.g., cotton, polypropylene, etc.), or a combination thereof. In at least one example, the seat cushion 406 may include a polyurethane material. In such examples, the seat cushion 406 may provide a soft surface upon which a passenger, such as passenger 116, may sit. The seat cushion 406 may be configured to couple to and sit atop the seat pan 404. The seat cushion 406 may couple to the seat pan 404 via hook and loop connectors (e.g., couplings), adhesives, snap-fit connectors, screw-type connectors, spring-type connectors, and/or any other connector configured to couple same or different materials together.

In the illustrative example, the airbag 402 may be coupled to an interior surface of the seat pan 404. In such an example, the airbag 402 may rest between the seat pan 404 and the seat cushion 406 after the seat assembly 400 is assembled. As illustrated in FIG. 4, a chamber 408 of the airbag 402 may be coupled to the seat pan 404 via five couplings 410, such as couplings 410(1), 410(2), 410(3), 410(4), and 410(5). In other examples, the airbag 402 may be coupled to the seat pan 404 via a greater or lesser number of couplings 410. As described above, the couplings 410 may include any type of mechanical coupling, such as, for example, snap-fit couplings, screws, rivets, spring-type couplings, or the like.

In the illustrative example, the airbag 402 may include a substantially L-shaped chamber 408. In other examples, the chamber 408 may include a substantially rectangular, ovular, hexagonal, D-shaped, or any other shaped chamber 408, though any other shape is contemplated (e.g., shapes that substantially conform to a shape of a corresponding seat, that conform to a shape of a passenger or cargo proximal thereto, or the like). In various examples, the chamber 408 of the airbag 402 may be configured to deploy upon activation of an inflator 412. In some examples, the inflator 412 may be armed based at least in part on a signal from a position sensor. The position sensor may include a weight sensor, a perception sensor (e.g., image capture device, etc.), and/or any other type of sensor configured to determine sense a presence of a passenger in the seat assembly 400. As illustrated in FIG. 4, such an airbag 402 may be substantially unfolded. Storing the airbag 402 in such a configuration may require less space in a width direction, while enabling faster expansion times, lower pressurization requirements, and the like.

In various examples, the inflator 412 may be configured to deploy based at least in part on a signal from one or more sensors of the vehicle. In some examples, the sensor(s) may include one or more impact sensors. The impact sensor(s) may detect an impact with an object (and/or surface) and send the signal indicating the impact directly to the inflator 412 and/or to a vehicle computing device, and/or to the inflator 412 via the vehicle computing device. In some examples, the sensor(s) may include one or more perception sensors. In such examples, the perception sensor(s) may be configured to capture sensor data of objects in an environment and send the sensor data to the vehicle computing device for processing. The vehicle computing device may be configured to detect and identify objects and/or surfaces in the environment based on the sensor data. In some examples, the vehicle computing device may determine that a detected and/or identified object in the environment has a constant bearing and decreasing range toward a side of the vehicle. In such examples, the vehicle computing device may determine, based on a closure rate, speeds of the object and/or vehicle, accelerations of the object and/or vehicle, weather, road conditions, or other factors affecting an ability of a vehicle and/or object to slow down or stop in the environment, that a side impact (e.g., side collision) with the object is imminent. In various examples, the vehicle computing device may send a signal to the inflator 412 indicating imminent impact and/or an impact with the object.

Responsive to receiving the signal from the sensor and/or the vehicle computing device, the inflator 412 may cause the chamber 408 to fill with gas and expand toward the passenger. In the illustrative example, the chamber 408 may expand toward the passenger and deform the seat cushion 406. As discussed above, the seat cushion 406 may include a pliable material, capable of deforming and/or expanding with the chamber 408 of the airbag 402. The seat cushion 406 may thus be the surface against which the passenger makes contact during a side impact.

Figure 5:
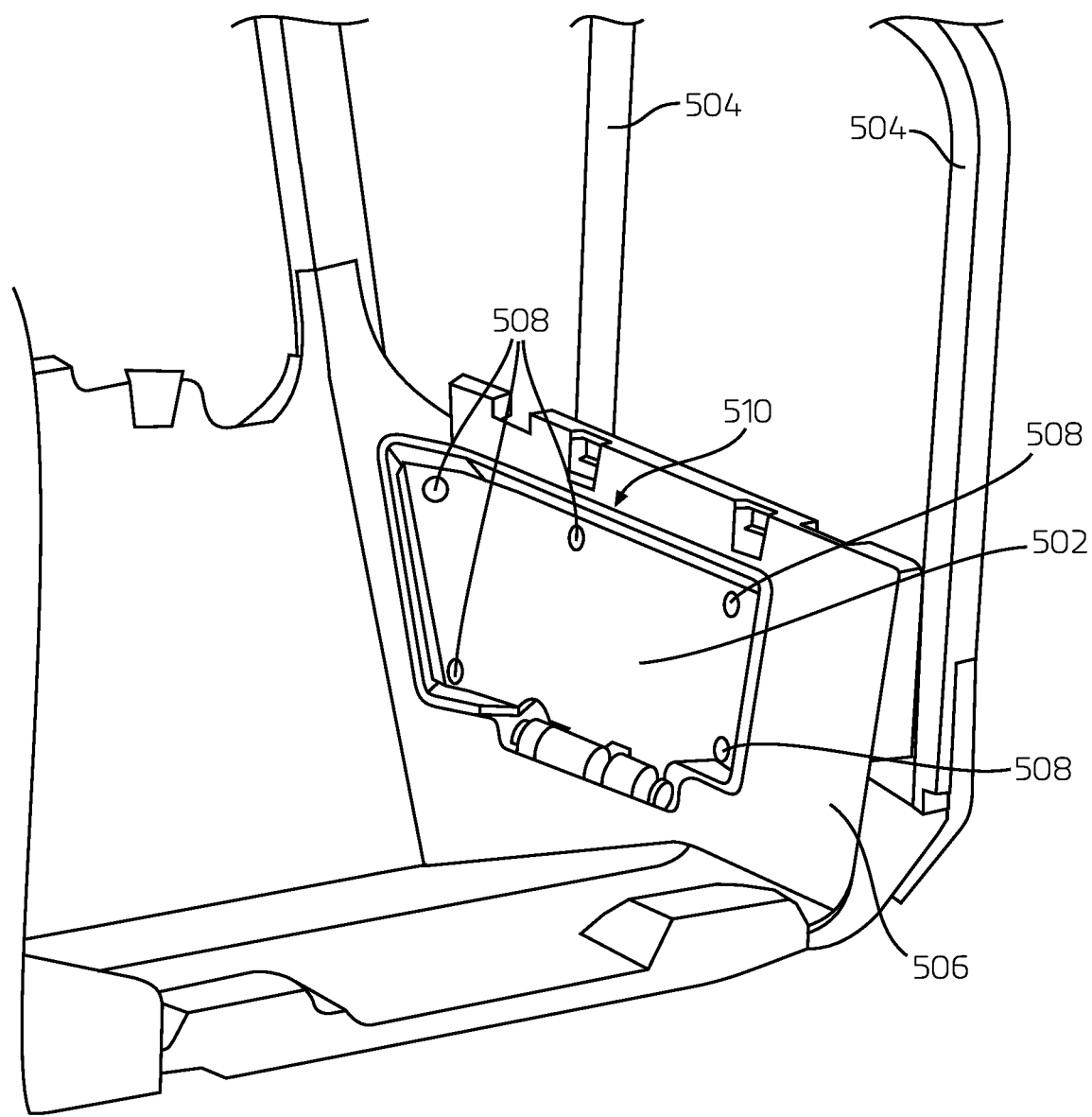
FIG. 5 is a front perspective view of an example airbag coupled to an external seat frame to which a seat assembly is coupled.

FIG. 5 is a front perspective view of an example airbag 502, such as airbag 102, coupled to an external seat frame 504 to which a seat pan 506, such as seat pan 404, is additionally coupled. In some examples, the seat pan 506 may additionally or alternatively be coupled to a seat tub, such as seat tub 104. In the illustrative example, the airbag 502 is coupled to the external seat frame 504 via one or more couplings 508. The coupling(s) 508 may include snap-fit couplings, screws, rivets, spring-type couplings, or any other mechanical coupling configured to securely couple the side airbag 502 to the external seat frame 504. Though illustrated as five couplings 508, a greater or lesser number of couplings 508 may be used to couple the airbag 502 to the external seat frame 504.

In some examples, the airbag 502 may be configured to deploy and extend (e.g., expand in size due to introduction of gas) toward a passenger seated in the seat pan 506. In some examples, the airbag 502, upon deployment, may deform at least a portion of the seat pan 506 and a seat cushion (not illustrated), such as seat cushion 108, coupled to the seat pan 506.

In the illustrative example, the airbag 502 may be configured to deploy and extend toward the passenger through an opening 510 in the seat pan 506. In various examples, the airbag 502 may deform at least a portion of the opening 510 upon deployment. For example, the edges of the opening 510 may be deformed by forces imparted upon it during a deployment of the airbag 502. As discussed above, the airbag 502 may extend toward a passenger and deform the seat cushion coupled to the seat pan 506. The seat cushion may include a soft, pliable material, and may be the surface that the passenger contacts during a side impact with an object. The airbag 502 and the seat cushion and/or seat pan 506 may slow the acceleration of the passenger during the side impact and may reduce potential injuries of the passenger associated with the side impact.

Figure 6:
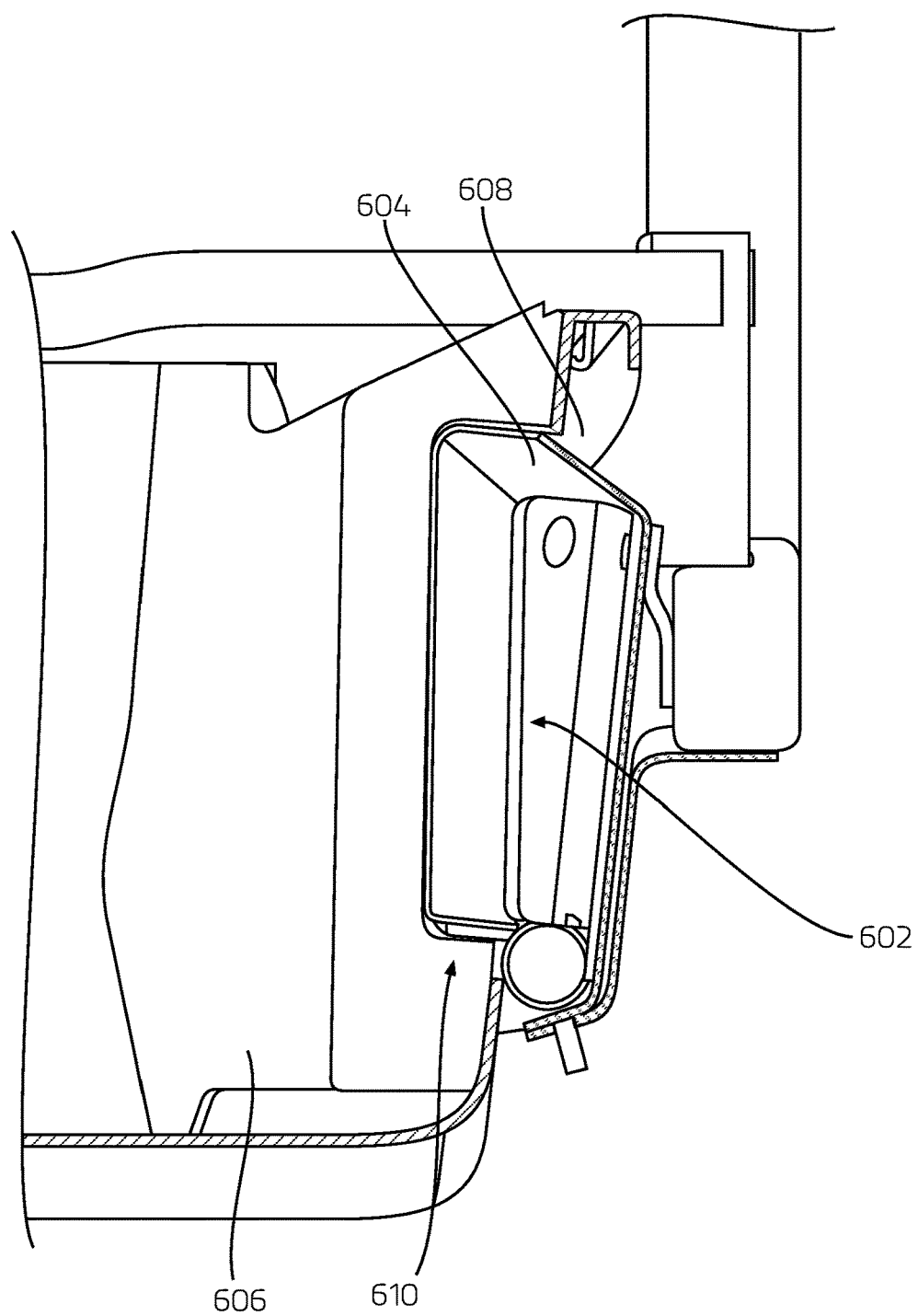
FIG. 6 is a front side cross-sectional view of an example airbag mounted in a storage container.

FIG. 6 is a front side cross-sectional view of an example airbag 602, such as airbag 102, mounted in a storage container 604. The storage container 604 may include a plastic material (e.g., polypropylene, polyethylene, etc.), a metal material (e.g., aluminum, titanium, etc.), a composite material (e.g., carbon fiber, fiber glass, etc.), a fabric material (e.g., cotton, polypropylene, etc.), a rubber material (e.g., polyisoprene, EPDM ethylene propylene, neoprene, etc.), a foam material (e.g., polystyrene, polyethylene, etc.), and/or any other material capable of housing the airbag 602. In some examples, the storage container 604 may be coupled to a seat pan 606 of the vehicle, such as seat pan 404. In such examples, the storage container may be coupled to an interior surface (proximal to a seat cushion) or an exterior surface (distal from a seat cushion) of the seat pan 404. In various examples, the storage container 604 may be coupled to a seat tub of the vehicle, such as seat tub 104. In such examples, the storage container 604 may be coupled to an interior surface of the seat tub, an exterior surface of the seat tub, or a surface separate from the seat tub.

In the illustrative example, the storage container 604 is coupled to a vehicle frame 608. In some examples, the vehicle frame 608 can include an external seat frame, such as external seat frame 504, a vehicle frame, or other frame associated with the vehicle and/or components thereof. The storage container 604 may be coupled to the seat pan 606, a seat tub, and/or the vehicle frame 608 via one or more couplings, as described above. Additionally, in various examples, the airbag 602 may be coupled to the storage container 604 via one or more couplings. The airbag 602 may be housed in the storage container 604 in a folded or unfolded position.

In some examples, the airbag 602 may be configured to deploy and extend (e.g., expand in size due to introduction of gas) toward a passenger seated in the seat assembly (e.g., comprising a seat tub, a seat pan, and/or a seat cushion). In some examples, the airbag 602, upon deployment, may deform at least a portion of the seat pan 606 and a seat cushion (not illustrated), such as seat cushion 108, coupled to the seat pan 606. In various examples, the airbag 602, upon deployment, may deform the storage container 604. In some examples, a surface of the storage container 604 proximal to the passenger may be configured to break away so that the airbag may extend toward the passenger.

In the illustrative example, the airbag 602 may be configured to deploy and extend toward the passenger through an opening 610, such as opening 510, in the seat pan 606. In various examples, the airbag 602 may deform at least a portion of the opening 610 upon deployment. For example, the edges of the opening 610 may be deformed by forces imparted upon it during a deployment of the airbag 602 (e.g., from the airbag 602 and/or the storage container 604). As discussed above, the airbag 602 may extend toward a passenger and deform the seat cushion coupled to the seat pan 606. The seat cushion may include a soft, pliable material, and may be the surface that the passenger contacts during a side impact with an object. The airbag 602 and the seat cushion and/or seat pan 606 may slow the acceleration of the passenger during the side impact and may reduce potential injuries of the passenger associated with the side impact.

Figure 7:
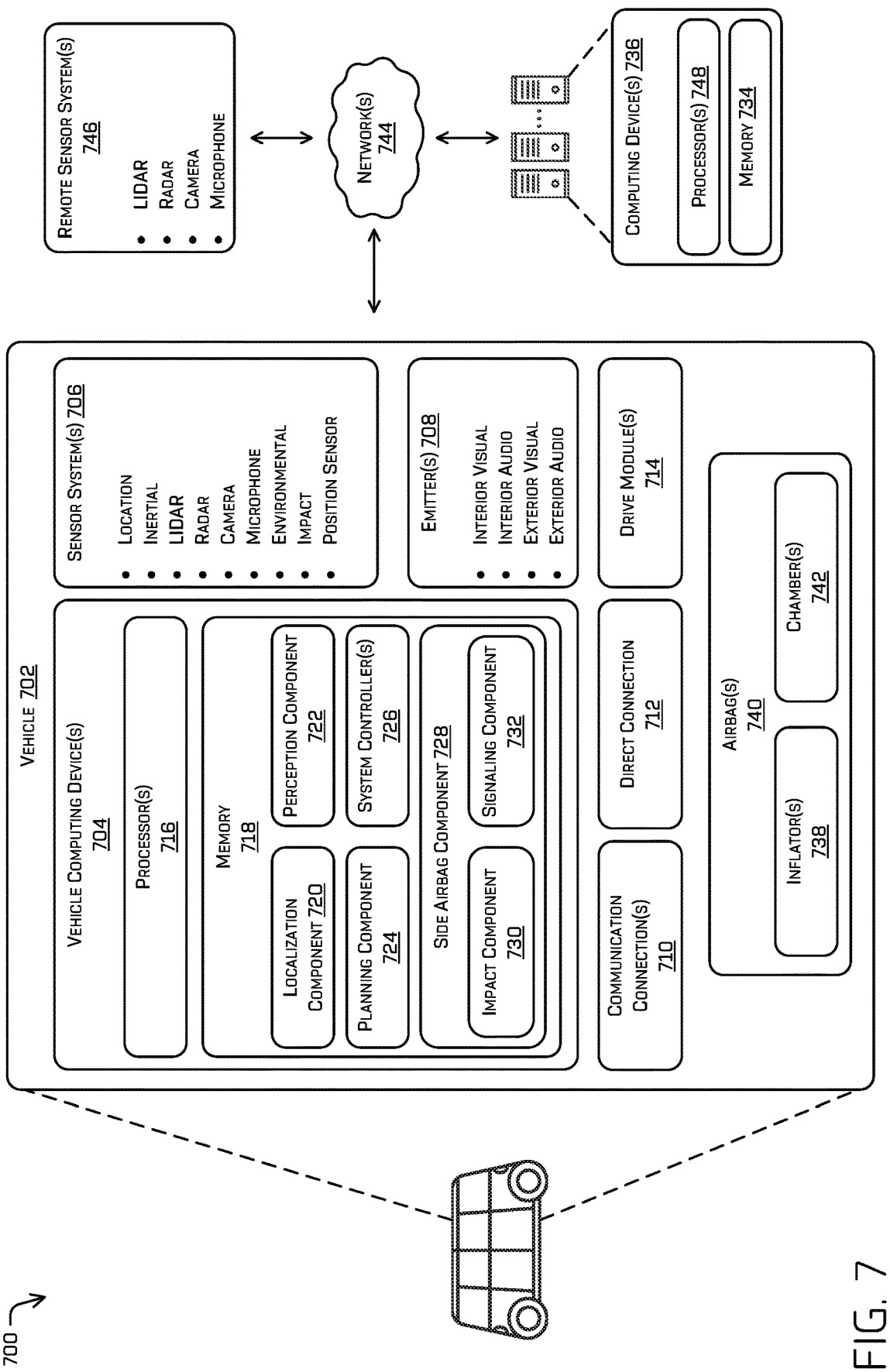
FIG. 7 is a block diagram of an example system for implementing the techniques described herein.

FIG. 7 is a block diagram of an example system 700 for implementing the techniques described herein. In at least one example, the system 700 may include a vehicle 702, such as the vehicle in which a seat tub may be mounted as described above with regard to FIGS. 1-6.

The vehicle 702 may include a vehicle computing device 704, one or more sensor systems 706, one or more emitters 708, one or more communication connections 710, at least one direct connection 712, and one or more drive modules 714.

The vehicle computing device 704 may include one or more processors 716 and memory 718 communicatively coupled with the one or more processors 716. The vehicle 702 may include any type of vehicle, such as an autonomous vehicle, a semi-autonomous vehicle, or any other system having at least an image capture device (e.g., a camera enabled smartphone). In the illustrated example, the memory 718 of the vehicle computing device 704 stores a localization component 720, a perception component 722, a planning component 724, one or more system controllers 726, and a side airbag component 728 including an impact component 730, and a signaling component 732. Though depicted in FIG. 7 as residing in the memory 718 for illustrative purposes, it is contemplated that the localization component 720, the perception component 722, the planning component 724, the system controllers 726, and the side airbag component 728 including the impact component 730, and the signaling component 732 may additionally, or alternatively, be accessible to the vehicle 702 (e.g., stored on, or otherwise accessible by, memory remote from the vehicle 702, such as, for example, on memory 734 of a remote computing device 736).

In at least one example, the localization component 720 may include functionality to receive data from the sensor system(s) 706 to determine a position and/or orientation of the vehicle 702 (e.g., one or more of an x-, y-, z-position, roll, pitch, or yaw). For example, the localization component 720 may include and/or request/receive a map of an environment and can continuously determine a location and/or orientation of the autonomous vehicle within the map. In some instances, the localization component 720 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 720 can provide data to various components of the vehicle 702 to determine an initial position of a vehicle for determining whether a side impact with an object may occur (e.g., imminent impact), as discussed herein.

In some examples, the perception component 722 may include functionality to perform object detection, segmentation, and/or classification. In some examples, the perception component 722 may provide processed sensor data that indicates a presence of an object that is proximate to the vehicle 702 and/or a classification of the object as an object type (e.g., car, pedestrian, cyclist, animal, building, tree, road surface, curb, sidewalk, unknown, etc.). In some examples, the perception component 722 may provide processed sensor data that indicates a presence of a stationary object that is proximate to the vehicle 702 and/or a classification of the stationary object as a type (e.g., building, tree, road surface, pole, curb, sidewalk, unknown, etc.). In additional or alternative examples, the perception component 722 may provide processed sensor data that indicates one or more characteristics associated with a detected object (e.g., a tracked object) and/or the environment in which the object is positioned. In some examples, characteristics associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Characteristics associated with the environment can include, but are not limited to, a presence of another object in the environment, a state of another object in the environment, a time of day, a day of a week, a season, a weather condition, an indication of darkness/light, etc.

In general, the planning component 724 may determine a path for the vehicle 702 to follow to traverse through an environment. For example, the planning component 724 may determine various routes and trajectories and various levels of detail. For example, the planning component 724 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 724 may generate an instruction for guiding the autonomous vehicle along at least a portion of the route from the first location to the second location. In at least one example, the planning component 724 may determine how to guide the vehicle 702 from a first waypoint in the sequence of waypoints to a second waypoint in the sequence of waypoints. In some examples, the instruction can be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 702 to navigate.

In some examples, the planning component 724 may include a prediction component to generate predicted trajectories of objects in an environment. For example, a prediction component may generate one or more predicted trajectories for objects within a threshold distance from the vehicle 702. In some examples, a prediction component may measure a trace of an object and generate a trajectory for the object based on observed and predicted behavior.

In at least one example, the vehicle computing device 704 may include one or more system controllers 726, which may be configured to control steering, propulsion, braking, safety, emitters, communication, and other systems of the vehicle 702. The system controller(s) 726 may communicate with and/or control corresponding systems of the drive module(s) 714 and/or other components of the vehicle 702.

As illustrated in FIG. 7, the vehicle computing device 704 may include a side airbag component 728. The side airbag component 728 may include an impact component 730 configured to determine an imminent impact (e.g., frontal impact, side impact, glancing impact, etc.) with an object. In various examples, side airbag component 728 may receive data from the perception component 722 regarding one or more objects in an environment. The data may include a trajectory of the object(s), speed of the object(s) to include a closing speed (e.g., closure rate), acceleration of the object(s), a bearing from the vehicle 702 to the object, and/or any other data to assist the impact component 730 in determining that an impact with an object is imminent.

In various examples, the impact component 730 may be configured to determine a time associated with the imminent impact. The time may be a particular time, such as, for example, 120 milliseconds after 3:05 pm, or it may be a time interval from a time in which imminent impact was determined. The time may be determined based on a measured closure rate of the object toward the vehicle 702, a velocity of the vehicle 702, an acceleration of the vehicle 702, a velocity of the object, an acceleration of the object, road conditions, weather conditions, and/or other factors that may affect a closure rate of an object toward a vehicle or vice versa.

In some examples, the side airbag component 530 may include a signaling component 732. The signaling component 732 may be configured to receive an indication of imminent impact with an object, such as from the impact component 730, and send a signal to one or more inflators 738 of one or more airbags 740, such as airbag 102. In various examples, the signal may cause an inflator 738 to expel gas into a chamber 742 of an airbag 740, upon receipt of the signal. In some examples, the signal may include a timing component. In such examples, the signal may cause the inflator 738 to expel gas into a chamber 742 of the airbag 740 at a particular time and/or after an indicated period of time (e.g., delay period). For example, the signaling component 732 may receive a time associated with the imminent impact from the impact component 730. The signaling component 732 may include the time in the signal, thereby causing the airbag 740 to deploy upon impact. For another example, the signaling component 732 may include a delay period, thereby causing the airbag 740 to deploy after the delay period. Responsive to receiving the signal, the inflator 738 may cause the chamber 742 to deploy toward a passenger seated in a passenger compartment of the vehicle 702.

As can be understood, the components discussed herein (e.g., the localization component 720, the perception component 722, the planning component 724, the one or more system controllers 726, the side airbag component 728 including the impact component 730, and the signaling component 732 are described as divided for illustrative purposes. However, the operations performed by the various components can be combined or performed in any other component.

In some instances, aspects of some or all of the components discussed herein can include any models, algorithms, and/or machine learning algorithms. For example, in some instances, the components in the memory 718 (and the memory 734, discussed below) can be implemented as a neural network.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet70, ResNet101, VGG, DenseNet, PointNet, and the like.

In at least one example, the sensor system(s) 706 may include LIDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. In various examples, the sensor system(s) 706 may include a position sensor configured to determine whether a passenger is seated in a seat assembly. In some examples, the position sensor may include a weight switch configured to determine whether a weight is located on the seat assembly. The weight may include a minimum weight associated with a passenger (e.g., 50 pounds, 25 kilograms, 100 pounds, etc.). In various examples, the position sensor may include an image capture device and/or other perception sensor. In such examples, the image capture device and/or other perception sensor may send sensor data to the vehicle computing device to analyze and determine whether the object in the seat assembly is a passenger (e.g., whether it is a human or other live animal).

The sensor system(s) 706 can include multiple instances of each of these or other types of sensors. For instance, the LIDAR sensors can include individual LIDAR sensors located at the corners, front, back, sides, and/or top of the vehicle 702. As another example, the camera sensors can include multiple cameras disposed at various locations about the exterior and/or interior of the vehicle 702. The sensor system(s) 706 can provide input to the vehicle computing device 704. Additionally or alternatively, the sensor system(s) 706 may send sensor data, via the one or more networks 744, to the one or more computing device(s) 736 at a particular frequency, after a lapse of a predetermined period of time, in near real-time, etc.

The vehicle 702 may also include one or more emitters 708 for emitting light and/or sound, as described above. The emitters 708 in this example include interior audio and visual emitters to communicate with passengers of the vehicle 702. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 708 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 702 may also include one or more communication connection(s) 710 that enable communication between the vehicle 702 and one or more other local or remote computing device(s). For instance, the communication connection(s) 710 can facilitate communication with other local computing device(s) on the vehicle 702 and/or the drive module(s) 714. Also, the communication connection(s) 710 can allow the vehicle to communicate with other nearby computing device(s) (e.g., computing device(s) 736, other nearby vehicles, etc.) and/or one or more remote sensor system(s) 746 for receiving sensor data.

The communications connection(s) 710 may include physical and/or logical interfaces for connecting the vehicle computing device 704 to another computing device or a network, such as network(s) 744. For example, the communications connection(s) 710 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 702 may include one or more drive modules 714. In some examples, the vehicle 702 can have a single drive module 714. In at least one example, if the vehicle 702 has multiple drive modules 714, individual drive modules 714 may be positioned on opposite ends of the vehicle 702 (e.g., the front and the rear, etc.). In at least one example, the drive module(s) 714 may include one or more sensor systems to detect conditions of the drive module(s) 714 and/or the surroundings of the vehicle 702. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, radar sensors, etc. Some sensors, such as the wheel encoders can be unique to the drive module(s) 714. In some cases, the sensor system(s) on the drive module(s) 714 can overlap or supplement corresponding systems of the vehicle 702 (e.g., sensor system(s) 706).

The drive module(s) 714 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 714 may include a drive module controller which can receive and preprocess data from the sensor system(s) and to control operation of the various vehicle systems. In some examples, the drive module controller can include one or more processors and memory communicatively coupled with the one or more processors. The memory can store one or more modules to perform various functionalities of the drive module(s) 714. Furthermore, the drive module(s) 714 may also include one or more communication connection(s) that enable communication by the respective drive module with one or more other local or remote computing device(s).

In at least one example, the direct connection 712 may provide a physical interface to couple the one or more drive module(s) 714 with the body of the vehicle 702. For example, the direct connection 712 may allow the transfer of energy, fluids, air, data, etc. between the drive module(s) 714 and the vehicle. In some instances, the direct connection 712 can further releasably secure the drive module(s) 714 to the body of the vehicle 702.

In at least one example, the localization component 720, the perception component 722, the planning component 724, the one or more system controllers 726, and the side airbag component 728 and various components thereof, may process sensor data, as described above, and may send their respective outputs, over the one or more network(s) 744, to the computing device(s) 736. In at least one example, the localization component 720, the perception component 722, the planning component 724, the one or more system controllers 726, and the side airbag component 728 may send their respective outputs to the computing device(s) 736 at a particular frequency, after a lapse of a predetermined period of time, in near real-time, etc.

In some examples, the vehicle 702 may send sensor data to the computing device(s) 736 via the network(s) 744. In some examples, the vehicle 702 may receive sensor data from the computing device(s) 736 and/or from remote sensor systems 746 via the network(s) 744. The sensor data may include raw sensor data and/or processed sensor data and/or representations of sensor data. In some examples, the sensor data (raw or processed) may be sent and/or received as one or more log files.

The computing device(s) 736 may include processor(s) 748 and a memory 734 configured to store data. The processor(s) 716 of the vehicle 702 and the processor(s) 748 of the computing device(s) 736 may be any suitable processor capable of executing instructions to process data and perform operations as described herein. By way of example and not limitation, the processor(s) 716 and 748 may comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 718 and 734 are examples of non-transitory computer-readable media. The memory 718 and 734 may store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, the memory 718 and 734 may include at least a working memory and a storage memory. For example, the working memory may be a high-speed memory of limited capacity (e.g., cache memory) that is used for storing data to be operated on by the processor(s) 716 and 748. In some instances, the memory 718 and 734 may include a storage memory that may be a lower-speed memory of relatively large capacity that is used for long-term storage of data. In some cases, the processor(s) 716 and 748 cannot operate directly on data that is stored in the storage memory, and data may need to be loaded into a working memory for performing operations based on the data, as discussed herein.

It should be noted that while FIG. 7 is illustrated as a distributed system, in alternative examples, components of the vehicle 702 may be associated with the computing device(s) 736 and/or components of the computing device(s) 736 may be associated with the vehicle 702. That is, the vehicle 702 may perform one or more of the functions associated with the computing device(s) 736, and vice versa.

Figure 8:
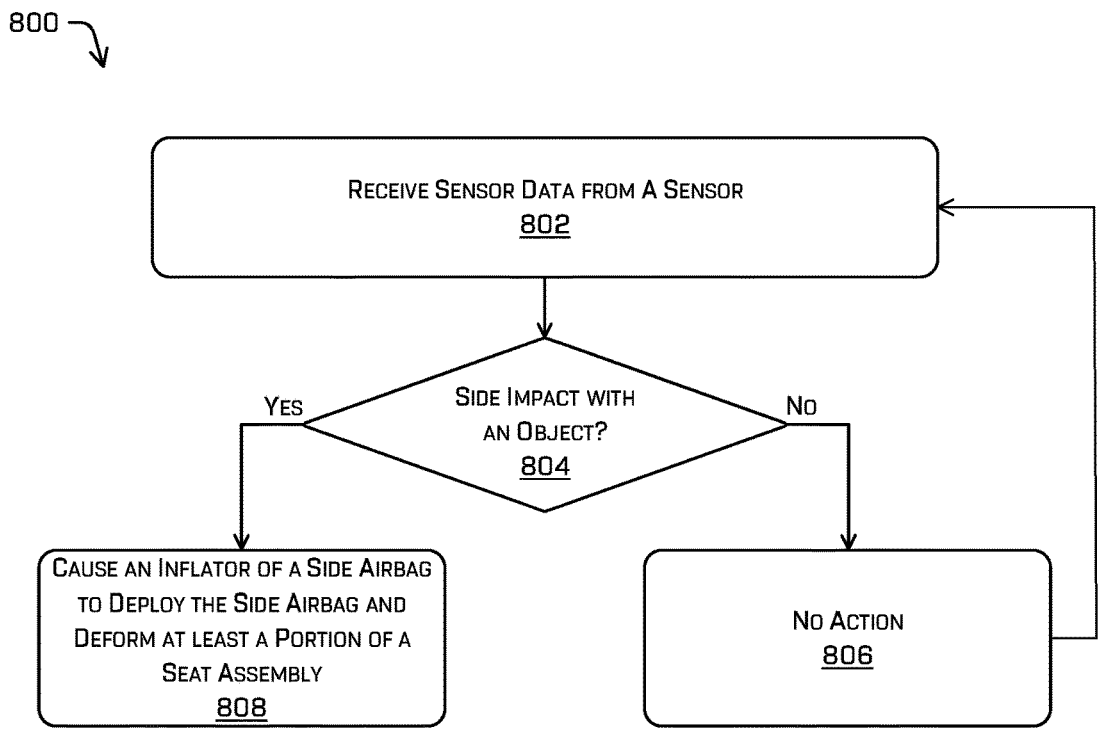
FIG. 8 is a flow chart of an example process for causing a deployment of a side airbag.

FIG. 8 illustrates an example process in accordance with embodiments of the disclosure. This process is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 8 depicts an example process 800 for causing a deployment of a side airbag of a vehicle. For example, some or all of the process 800 can be performed by one or more components in FIG. 7, as described herein. For example, some or all of the process 800 may be performed by the vehicle computing device(s) 704.

At operation 802, the process may include receiving sensor data from a sensor. In some examples, the vehicle computing device may receive the sensor data from the sensor. In various examples, the sensor may include a perception sensor, as described above. In such examples, the sensor data may include an indication of an object (e.g., vehicle, bicyclist, pole, wall, or the like) with a constant bearing and decreasing range toward a side of the vehicle. For stationary remote objects, the indication may signal to the vehicle computing device that the vehicle is sliding or otherwise moving sideways toward the stationary remote object.

In some examples, the sensor may include an impact sensor and the sensor data may include an electrical signal indicating impact. In such examples, the impact sensor may send the electrical signal to the inflator.

At operation 804, the process may include determining whether a side impact with an object has occurred and/or is imminent. In some examples, the process may include determining that the side impact will occur within a threshold period of time. In various examples, the vehicle computing device may determine the side impact has occurred or is imminent based on the received sensor data. In some examples, the vehicle computing device may determine that the impact is imminent based on a high closure rate of the object that cannot or likely will not be stopped in a distance remaining between the vehicle and the object. For example, the vehicle computing device may determine that another vehicle has a constant bearing toward a side of the vehicle and the range is rapidly decreasing at a rate that indicates imminent impact. The vehicle computing device may thus determine that the side impact with the other vehicle is imminent.

In some examples, the inflator may receive the electrical signal indicating impact from the impact sensor. In such examples, the inflator may determine the side impact with the object has occurred.

If the vehicle computing device determines that a side impact with the object will not occur and/or is not imminent, (e.g., "no" in the operation 804), the process continues to operation 806. At operation 806, the process may include determining that no action is necessary. Based on a determination to take no action with respect to airbag deployment, the process may return to operation 802.

If the time meets or exceeds the threshold period of time (e.g., "yes" in the operation 804), the process continues to operation 808. At operation 808, the process may include causing an inflator of a side airbag to deploy the side airbag and deform at least a portion of a seat assembly.

In various examples, the vehicle computing device may cause the inflator to deploy based on a determination that the side impact with the object is imminent. In such examples, the vehicle computing device may send a signal to the inflator, thereby causing the inflator to ignite and fill the one or more chambers of the side airbag with gas. In some examples, the inflator may receive the electrical signal directly from the impact sensor. In such examples, the inflator may automatically deploy the one or more chambers of the airbag based on receiving the electrical signal.

Responsive to the inflator filling a chamber of the side airbag with gas, the chamber may expand toward the passenger compartment. The expansion of the chamber may exert forces on a portion of seat tub of the seat assembly and/or a portion of a cushion of the seat assembly, thereby causing the portion of the seat tub and/or the portion of the cushion to deform into the passenger compartment.

Example Clauses

A: A vehicle comprising: a body having a passenger compartment; a seat assembly disposed in the passenger compartment; a side airbag system at least partially obscured from the passenger compartment by a component of the seat assembly, the side airbag system comprising: a sensor configured to detect one or more of an impact with an object or an imminent impact with an object; a chamber; and an inflator coupled to the chamber and in communication with the impact sensor; one or more processors; and one or more memories storing computer-executable instructions that, when executed, cause the one or more processors to perform acts comprising: receiving a signal from the sensor indicative of a side impact; and causing, based at least in part on the signal, the chamber to expand, wherein, when fully expanded, the chamber of the side airbag system is fully obscured from the passenger compartment by the seat assembly.

B: The vehicle as paragraph A describes, wherein the chamber of the side airbag system is coupled to a surface of the seat assembly in an unfolded condition.

C: The vehicle as paragraphs A or B describe, wherein the chamber is coupled to at least one of a receiver configured to couple to at least a portion of a seat cushion or an external seat frame.

D: The vehicle as any of paragraphs A-C describe, wherein the seat assembly comprises: a seat pan; a cushion; and a receiver configured to couple to at least one of the seat pan or the cushion; wherein responsive to the chamber filling with gas, the chamber deforms at least one of the seat pan, the cushion, or the receiver.

E: The vehicle as any of paragraphs A-D describe, wherein the sensor is a perception sensor, the one or more memories further store computer-executable instructions that, when executed, cause the one or more processors to perform acts comprising: receiving sensor data from the perception sensor; determining that a side impact with the object is within a threshold time period based at least in part on the sensor data; and sending a deployment signal to the inflator causing the inflator to deploy the chamber.

F: The vehicle as any of paragraphs A-E describe, wherein the side airbag system further comprises a position sensor communicatively coupled to the inflator, an output of the position sensor indicative of whether a passenger is seated in the seat assembly, wherein the inflator is configured to receive position sensor data from the position sensor and to determine whether to fill the chamber with gas.

G: A side airbag comprising: a chamber configured to be coupled to a side portion of a seat assembly of a vehicle; and an inflator coupled to the chamber, wherein the inflator is configured to receive a signal indicating a side impact and, based at least in part on the signal, cause the chamber to expand toward the centerline of the seat assembly and deform at least a portion of the seat assembly toward the centerline of the seat assembly, wherein, when fully expanded, the chamber is occluded from a passenger compartment of the vehicle by at least a portion of the seat assembly.

H: The side airbag as paragraph G describes, wherein the chamber is coupled to the side portion of the seat assembly in an unfolded condition.

I: The side airbag as paragraphs G or H describe, wherein the seat assembly comprises: a seat pan; a cushion; and a receiver configured to couple to at least one of the seat pan or the cushion; wherein responsive to the chamber expanding, the chamber deforms at least one of the seat pan, the cushion, or the receiver.

J: The side airbag as any of paragraphs G-I describe, wherein the inflator is configured to receive an arming signal from a weight sensor based on a determination by the weight sensor that a weight of an article in the seat assembly proximate the side airbag is above a threshold weight, and wherein the arming signal causes the inflator to arm for deployment.

K: The side airbag as any of paragraphs G-I describe, wherein the inflator is configured to receive an arming signal from an image sensor configured to capture an image of the seat assembly and determine whether a passenger is located in the seat assembly proximate the side airbag, and wherein the arming signal causes the inflator to arm for deployment.

L: The side airbag as any of paragraphs G-K describe, wherein the signal indicating the side impact comprises an indication of imminent impact with the object, and wherein the indication of imminent impact is determined by a computing device communicatively coupled to the inflator based at least in part on data received by the computing device from a perception sensor.

M: The side airbag as any of paragraphs G-K describe, wherein the signal indicating the side impact comprises an electrical signal from an impact sensor communicatively coupled to the inflator, the impact sensor being configured to detect an impact with the object.

N: A side airbag comprising: a chamber coupled to a portion of a seat frame of a vehicle to which a seat assembly is coupled and configured to expand toward a passenger compartment of the vehicle, wherein the chamber is coupled to the portion of the seat frame in an unfolded position; and an inflator coupled to the chamber, wherein the inflator is configured to receive a signal indicating a side impact with an object and, based at least in part on the signal, cause the chamber to expand toward the passenger compartment and deform at least a portion of the seat assembly toward the centerline of the seat assembly.

O: The side airbag as paragraph N describes, wherein the chamber is further configured to expand through an opening in the seat pan.

P: The side airbag as paragraphs N or O describe, wherein the seat assembly at least partially occludes the chamber from the passenger compartment.

Q: The side airbag as any of paragraphs N-P describe, wherein the seat assembly comprises: a seat pan; a cushion; and a receiver configured to couple to at least one of the seat pan or the cushion, wherein responsive to the chamber expanding toward the passenger compartment, the chamber deforms at least one of the seat pan, the cushion, or the receiver.

R: The side airbag as any of paragraphs N-Q describe, wherein the chamber comprises at least one of: a single compartment configured to hold gas; or two or more compartments configured to hold gas.

S: The side airbag as any of paragraphs N-R describe, wherein the signal indicating the side impact comprises an indication of imminent impact with the object, and wherein the indication of imminent impact is determined by a computing device communicatively coupled to the inflator based at least in part on sensor data received by a perception sensor.

T: The side airbag as any of paragraphs N-R describe, wherein the signal indicating the side impact comprises an electrical signal from an impact sensor communicatively coupled to the inflator, the impact sensor being configured to detect an impact with the object.

U: A method comprising: receiving sensor data from a sensor; determining a side impact with an object; and causing an inflator of a side airbag to deploy the side airbag and deform at least a portion of a seat assembly, wherein upon deployment of the side airbag, the side airbag is at least partially occluded from a passenger compartment.

V: The method as paragraph U describes, wherein the sensor comprises a perception sensor and the sensor data comprises an indication of imminent impact with the object, wherein the determining the side impact is based at least in part on the indication of imminent impact.

W: The method as paragraph U describes, wherein the sensor comprises an impact sensor and the sensor data comprises an electrical signal from the impact sensor indicating the side impact with the object.

X: The method as any of paragraphs U-W describe, wherein the seat assembly comprises: a seat pan; a cushion; and a receiver configured to couple to at least one of the seat pan or the cushion, wherein a deployment of the side airbag deforms at least one of the seat pan, the cushion, or the receiver.

Y: The method as any of paragraphs U-X describe, wherein, upon deployment, the side airbag is configured to expand through an opening in a seat pan.

Z: The method as any of paragraphs U-Y describe, wherein the side airbag is coupled to a surface of a vehicle in an unfolded position.

AA: The method as any of paragraphs U-Z describe, wherein the side airbag comprises at least one of: a single compartment configured to hold gas; or two or more compartments configured to hold gas.

AB: A system or device comprising: a processor; and a computer-readable medium coupled to the processor, the computer-readable medium including instructions to configure the processor to perform a method as any of paragraphs U-AA describe.

AC: A system or device comprising: a means for processing; and a means for storing coupled to the means for processing, the means for storing including instructions to configure one or more devices to perform a method as any of paragraphs U-AA describe.

AD: A computer-readable medium having thereon computer-executable instructions that, responsive to execution, configure a computer to perform a method as any of paragraphs U-AA describe.

While the example clauses described above are described with respect to one particular implementation, it should be understood that, in the context of this document, the content of the example clauses can also be implemented via a method, device, system, a computer-readable medium, and/or another implementation.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A vehicle comprising:
   a body having a passenger compartment;
   a seat assembly disposed in the passenger compartment and coupled to an external seat frame;
   a side airbag system at least partially obscured from the passenger compartment by a component of the seat assembly, the side airbag system comprising:
   a sensor configured to detect an imminent impact with an object;
   a chamber coupled to the external seat frame; and
   an inflator coupled to the chamber and in communication with the sensor, wherein the chamber and the inflator are configured such that the seat assembly is removable from the external seat frame without decoupling the side airbag system;
   one or more processors; and
   one or more memories storing computer-executable instructions that, when executed, cause the one or more processors to perform acts comprising:
   receiving a signal from the sensor indicative of the imminent impact; and
   causing, based at least in part on the signal, the chamber to expand,
   wherein, when fully expanded, the chamber of the side airbag system is fully obscured from the passenger compartment by the seat assembly.

2. The vehicle of claim 1, wherein the seat assembly further comprises:
   a seat tub and a seat pan;
   the chamber is coupled to the seat tub; and
   the chamber and the inflator are configured such that the seat pan of the seat assembly is removable from the seat tub without decoupling the side airbag system from the seat tub.

3. The vehicle of claim 1, wherein the chamber of the side airbag system is configured to be coupled to at least a portion of a seat cushion of the seat assembly or an external seat frame.

4. The vehicle of claim 1, wherein the seat assembly comprises:
   a seat pan; and
   a cushion,
   wherein responsive to the chamber filling with gas, the chamber deforms at least one of the seat pan or the cushion.

5. The vehicle of claim 1, wherein the sensor is a perception sensor, and wherein the acts further comprise:
receiving sensor data from the perception sensor;
determining that a side impact with the object is within a threshold time period based at least in part on the sensor data; and
sending a deployment signal to the inflator causing the inflator to deploy the chamber.

6. The vehicle of claim 5, wherein the threshold time period is based at least in part on at least one of:
one or more vehicle speeds of the vehicle;
one or more object speeds of the object;
a weather condition; or
a traffic density.

7. The vehicle of claim 1, wherein the acts further comprise determining a time associated with an impact with the object, and
wherein the chamber is expanded prior to or concurrently with the time associated with the impact with the object.

8. The vehicle of claim 1, wherein the side airbag system further comprises a position sensor communicatively coupled to the inflator, an output of the position sensor indicative of whether a passenger is seated in the seat assembly, wherein the inflator is configured to receive position sensor data from the position sensor and to determine whether to fill the chamber with gas.

9. A side airbag system at least partially obscured from a passenger compartment of a vehicle by a component of a seat assembly, wherein the seat assembly comprises a seat tub and a seat pan, the side airbag system comprising:
a sensor configured to detect an imminent impact with an object;
a chamber coupled to the seat tub;
an inflator coupled to the chamber and in communication with the sensor, wherein the chamber and the inflator are configured such that the seat pan of the seat assembly is removable from the seat tub without decoupling the side airbag system from the seat tub;
one or more processors; and
one or more memories storing computer-executable instructions that, when executed, cause the one or more processors to perform acts comprising:
receiving a signal from the sensor indicative of the imminent impact with the object; and
causing, based at least in part on the signal, the chamber to expand,
wherein, when fully expanded, the chamber of the side airbag system is fully obscured from the passenger compartment by the seat assembly.

10. The side airbag system of claim 9, wherein:
the seat assembly and the chamber of the side airbag system are coupled an external seat frame; and
the chamber and the inflator are configured such that the seat assembly is removable from the external seat frame without decoupling the side airbag system.

11. The side airbag system of claim 9, wherein the seat assembly comprises:
a seat pan; and
a cushion,
wherein responsive to the chamber filling with gas, the chamber deforms at least one of the seat pan or the cushion.

12. The side airbag system of claim 9, wherein the sensor is a perception sensor, and wherein the acts further comprise:
receiving sensor data from the perception sensor;
determining that a side impact with the object is within a threshold time period based at least in part on the sensor data; and
sending a deployment signal to the inflator causing the inflator to deploy the chamber.

13. The side airbag system of claim 12, wherein the threshold time period is based at least in part on at least one of:
one or more vehicle speeds of the vehicle;
one or more object speeds of the object;
a weather condition; or
a traffic density.

14. The side airbag system of claim 9, wherein the acts further comprise determining a time associated with an impact with the object, and
wherein the chamber is expanded prior to or concurrently with the time associated with the impact with the object.

15. The side airbag system of claim 9, further comprising a position sensor communicatively coupled to the inflator, an output of the position sensor indicative of whether a passenger is seated in the seat assembly, wherein the inflator is configured to receive position sensor data from the position sensor and to determine whether to fill the chamber with gas.

16. A side airbag comprising:
a chamber coupled to a portion of a seat frame of a vehicle to which a seat assembly is coupled and configured to expand toward a passenger compartment of the vehicle, wherein the chamber is coupled to the portion of the seat frame in an unfolded position and such that at least a portion of the seat assembly is removable without disturbing the side airbag; and
an inflator coupled to the chamber, wherein the inflator is configured to receive a signal indicating an imminent impact with an object and, based at least in part on the signal, cause the chamber to expand toward the passenger compartment and deform at least a portion of the seat assembly toward a centerline of the seat assembly.

17. The side airbag of claim 16, wherein:
the imminent impact with the object comprises a side impact with the object within a threshold period of time, and
the inflator causes the chamber to expand prior to or concurrently with the side impact with the object.

18. The side airbag of claim 16, wherein:
the seat assembly further comprises a seat tub and a seat pan;
the chamber is coupled to the seat tub; and
the chamber and the inflator are configured such that the seat pan of the seat assembly is removable from the seat tub without disturbing the side airbag.

19. The side airbag of claim 16, wherein the seat assembly comprises:
a seat pan; and
a cushion,
wherein responsive to the chamber filling with gas, the chamber deforms at least one of the seat pan or the cushion.

20. The side airbag of claim 16, further comprising a position sensor communicatively coupled to the inflator, an output of the position sensor indicative of whether a passenger is seated in the seat assembly, wherein the inflator is configured to receive position sensor data from the position sensor and to determine whether to fill the chamber with gas.

* * * * *